Oct. 10, 1950 F. C. CHOICE ET AL 2,524,882
END LASTING MACHINE FOR STITCHDOWN SHOES
Filed March 21, 1947 15 Sheets-Sheet 1

Inventors
Frank Coleman Choice
Cyril Harry James
By their Attorney

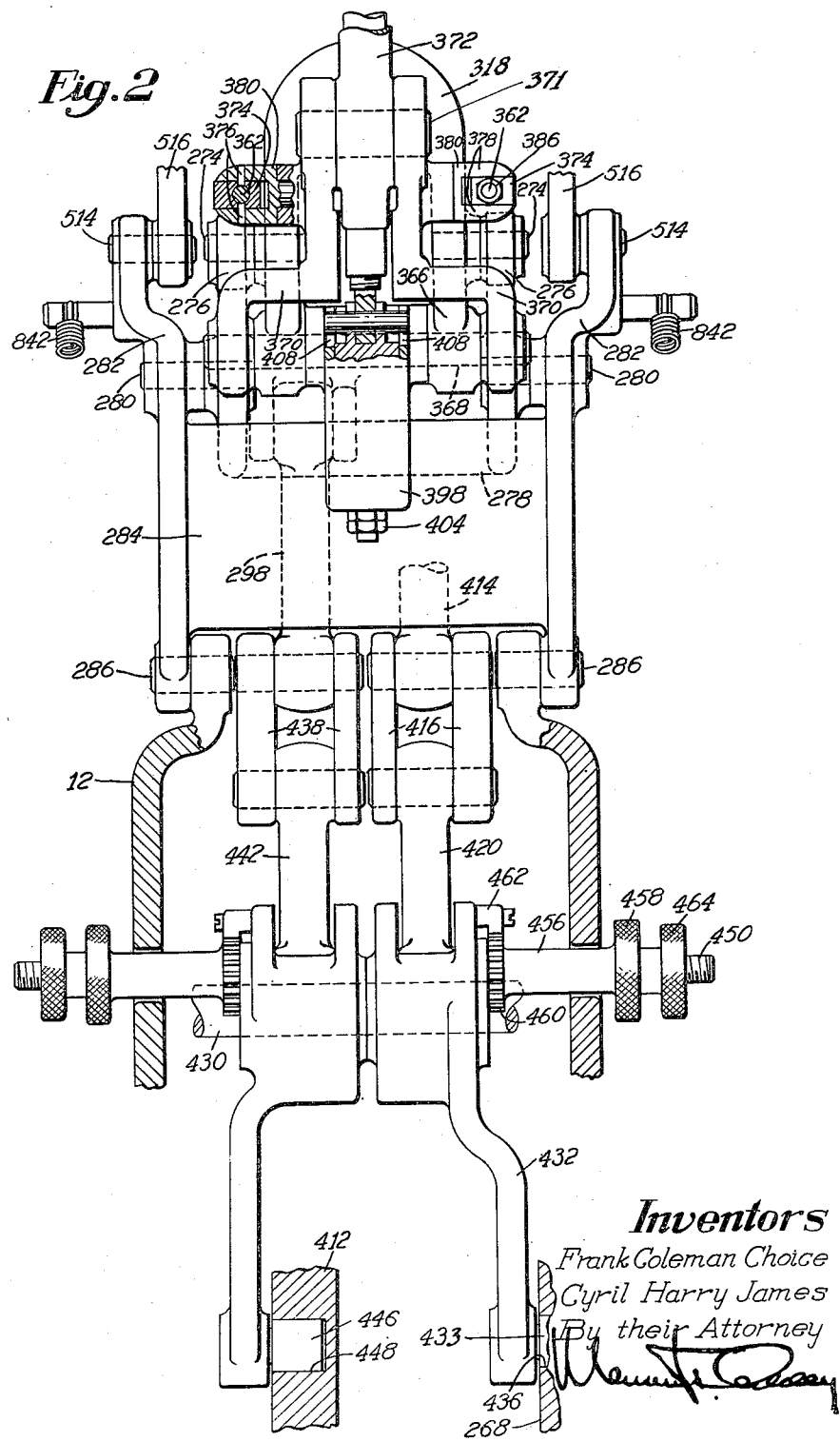

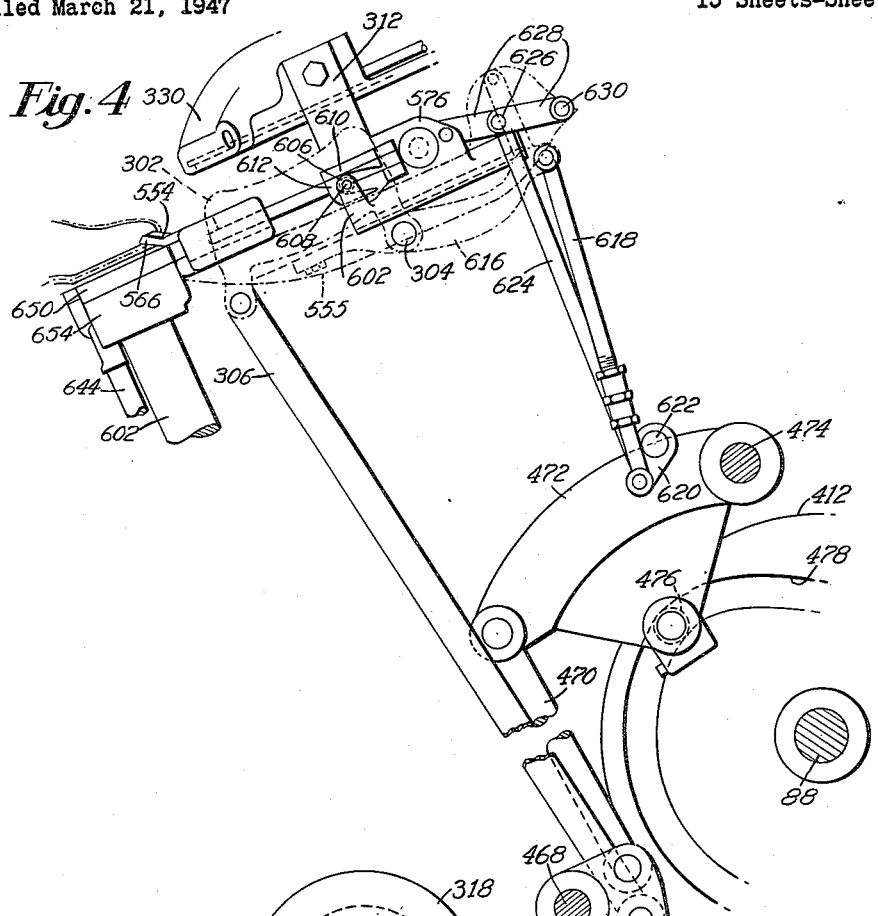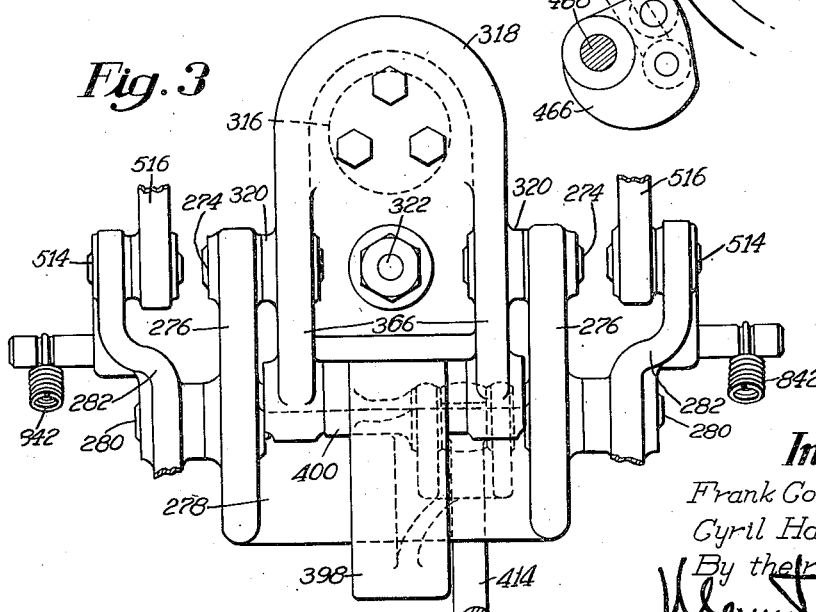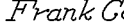

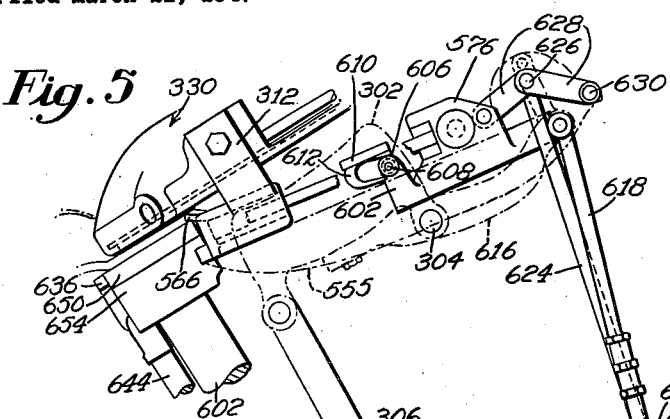
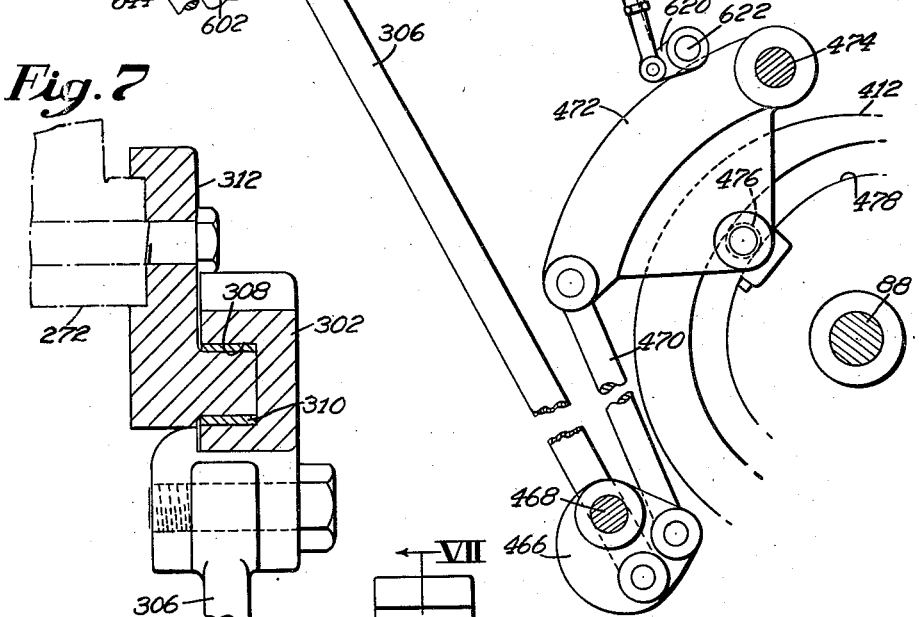
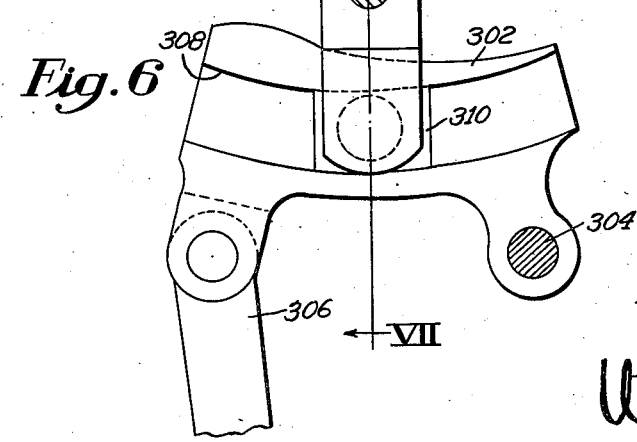
Inventors
Frank Coleman Choice
Cyril Harry James
By their Attorney

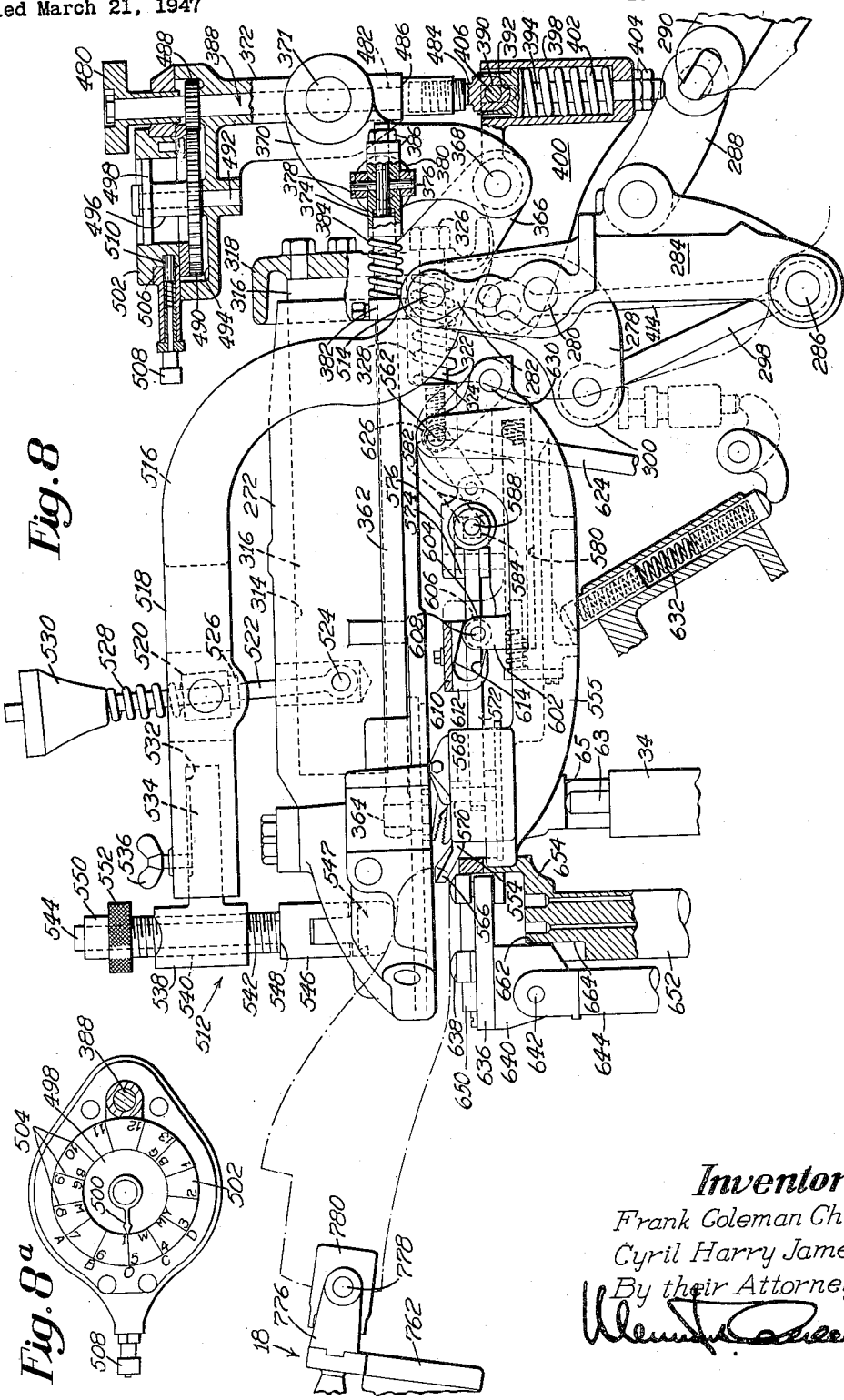

Oct. 10, 1950     F. C. CHOICE ET AL     2,524,882
END LASTING MACHINE FOR STITCHDOWN SHOES
Filed March 21, 1947     15 Sheets-Sheet 6
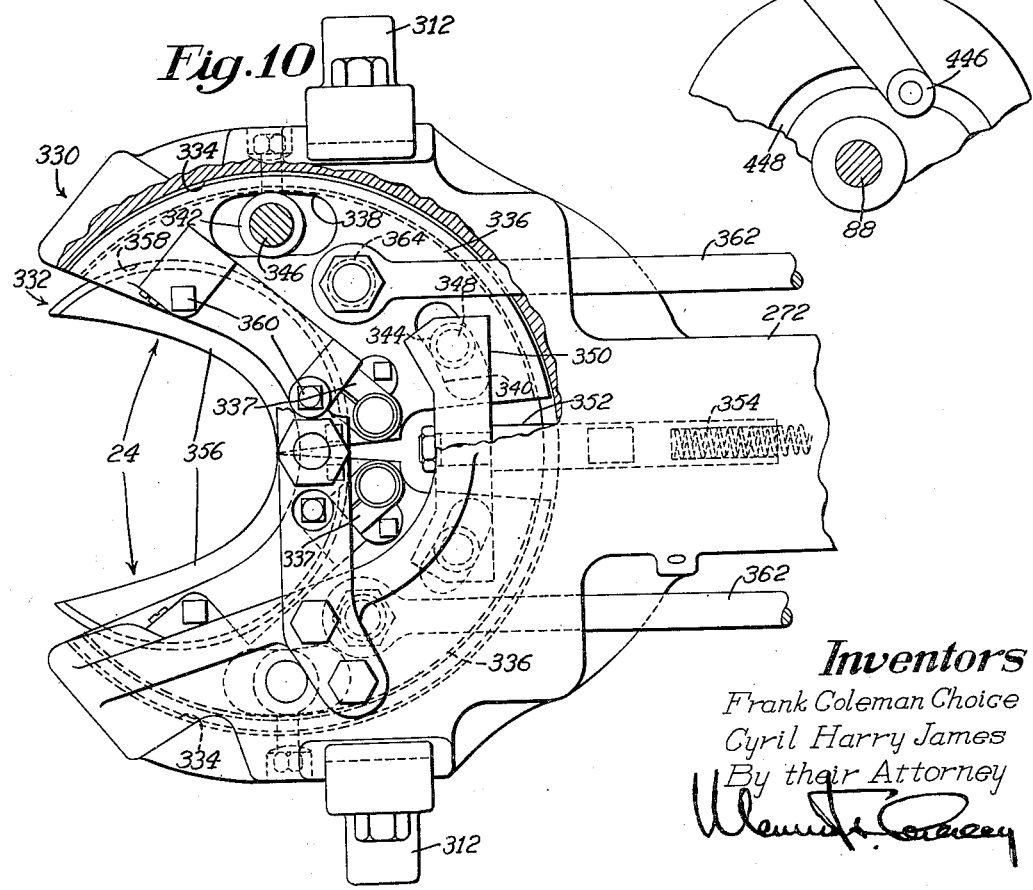
Inventors
Frank Coleman Choice
Cyril Harry James
By their Attorney Oct. 10, 1950 F. C. CHOICE ET AL 2,524,882
END LASTING MACHINE FOR STITCHDOWN SHOES
Filed March 21, 1947 15 Sheets-Sheet 7
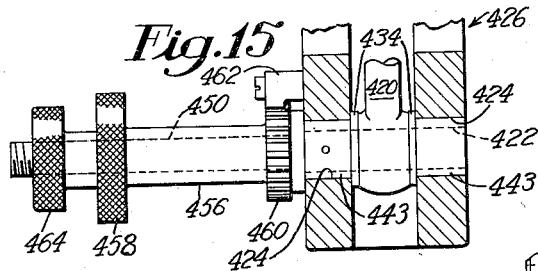
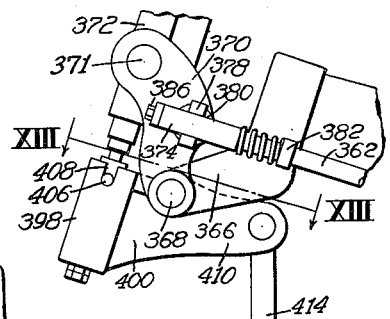
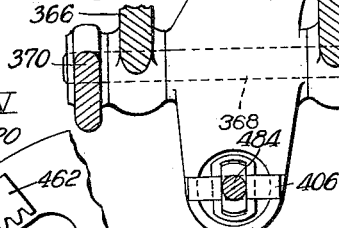
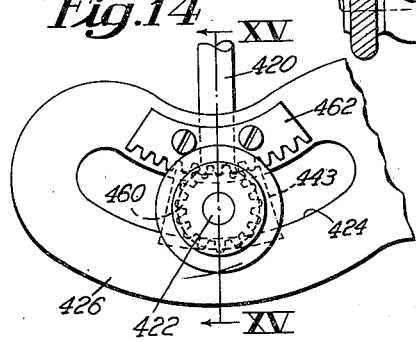
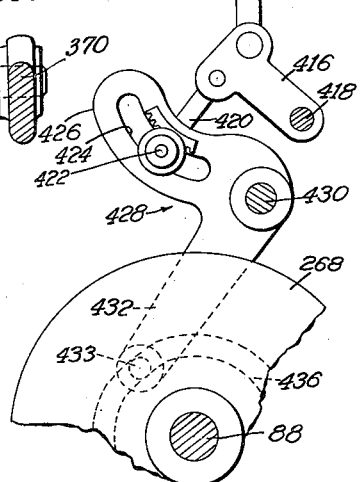
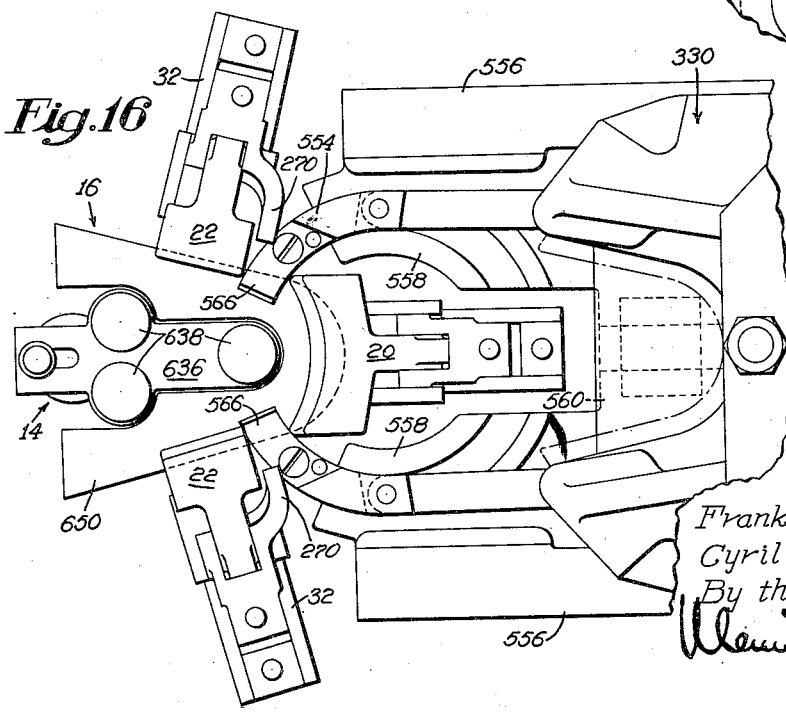
Inventors
Frank Coleman Choice
Cyril Harry James
By their Attorney

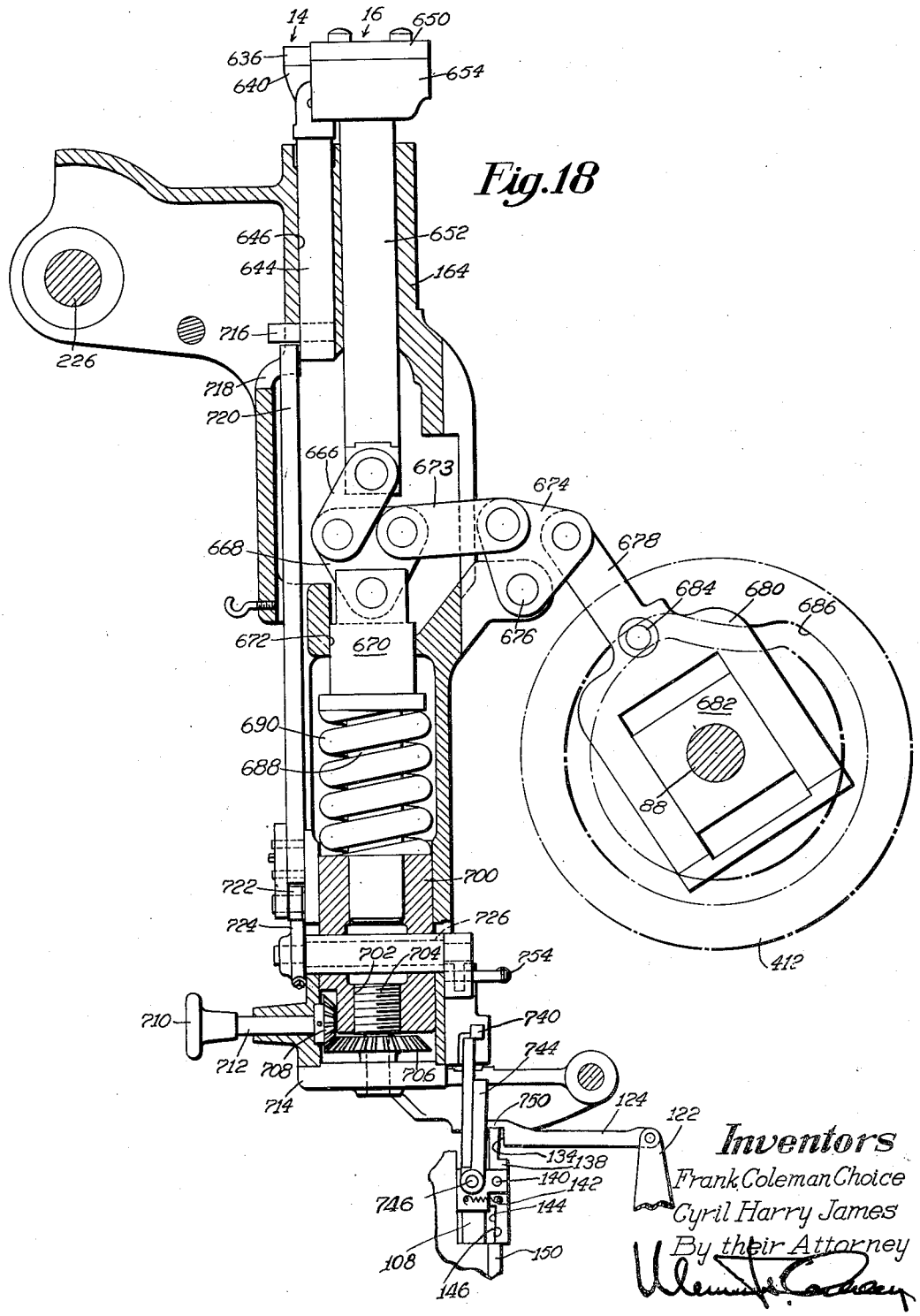

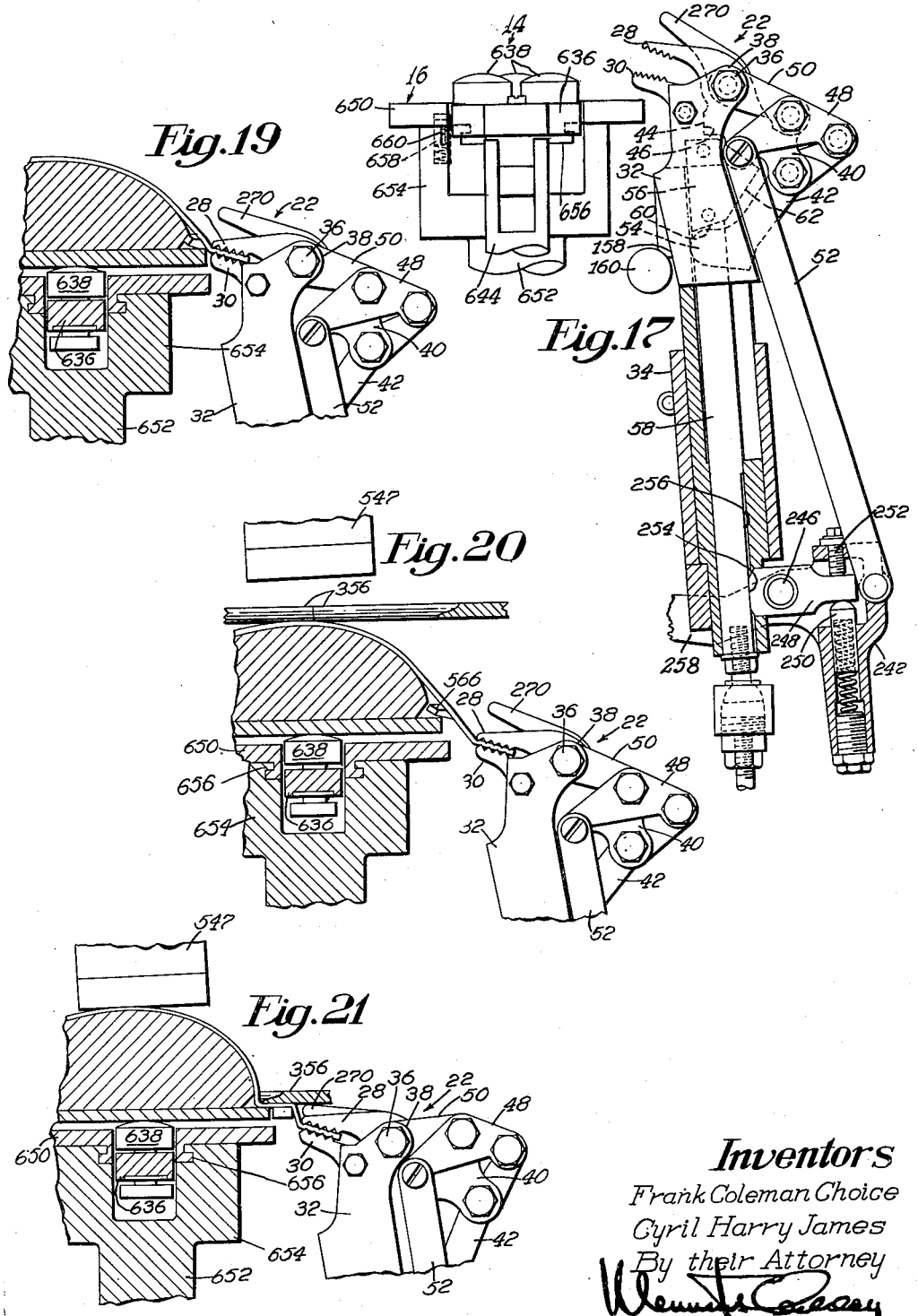

Oct. 10, 1950  F. C. CHOICE ET AL  2,524,882
END LASTING MACHINE FOR STITCHDOWN SHOES
Filed March 21, 1947  15 Sheets-Sheet 10
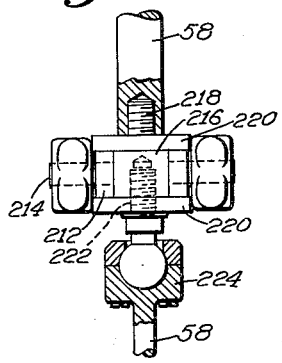
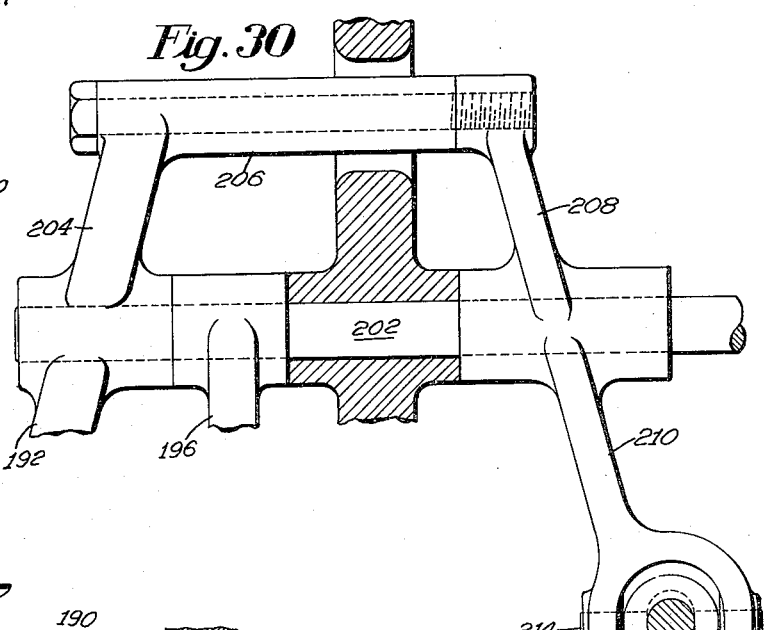
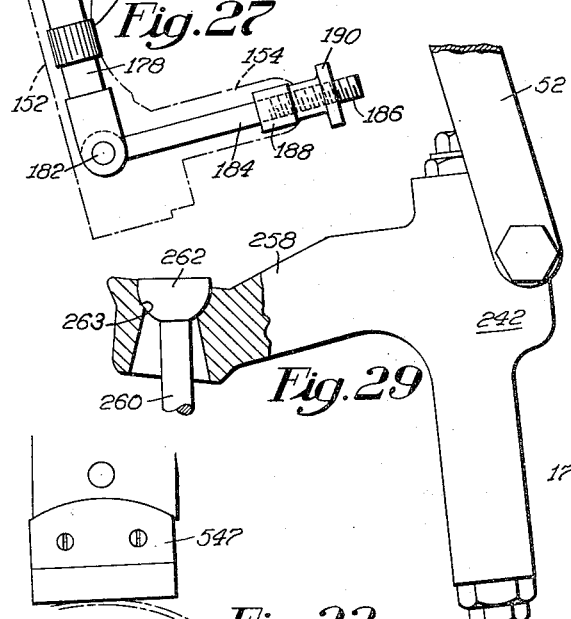
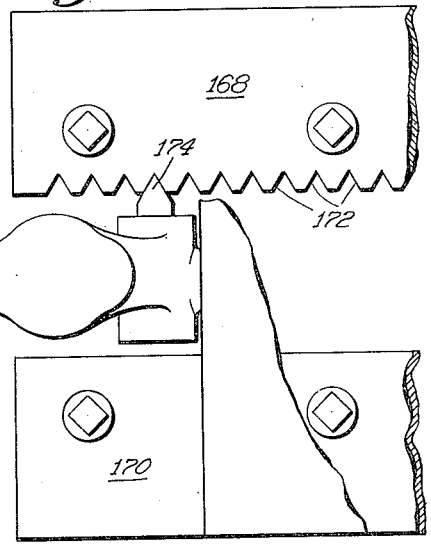
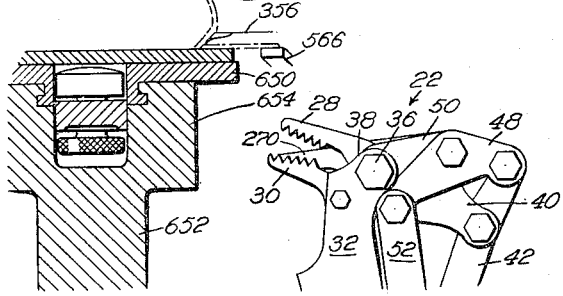
Inventors
Frank Coleman Choice
Cyril Harry James
By their Attorney

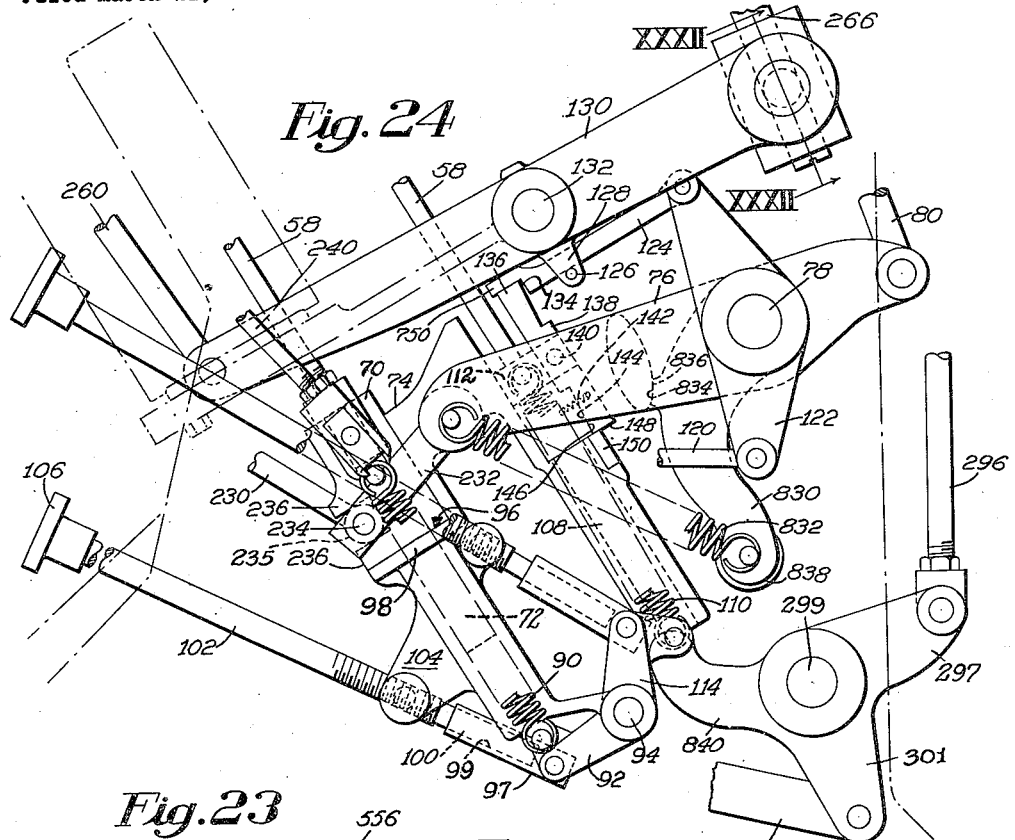

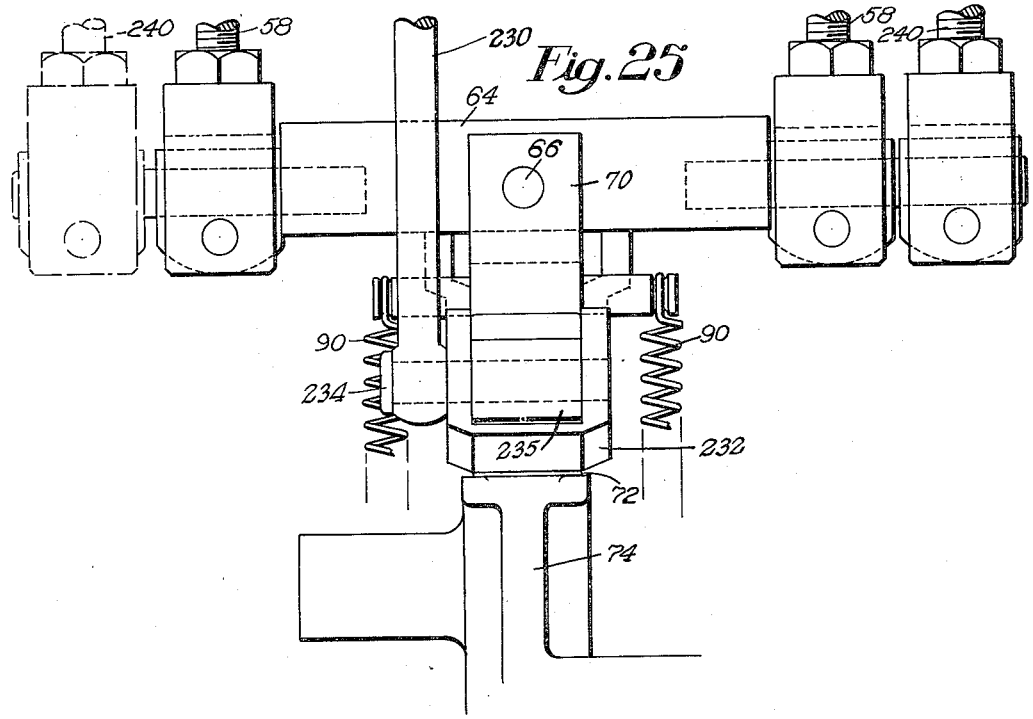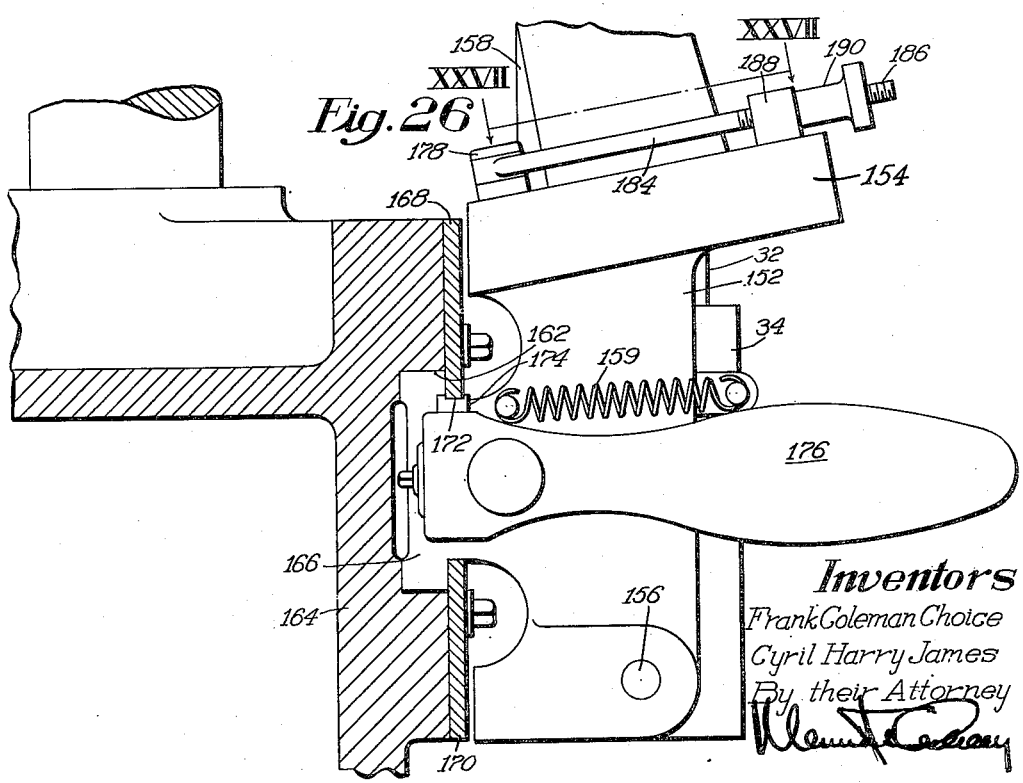

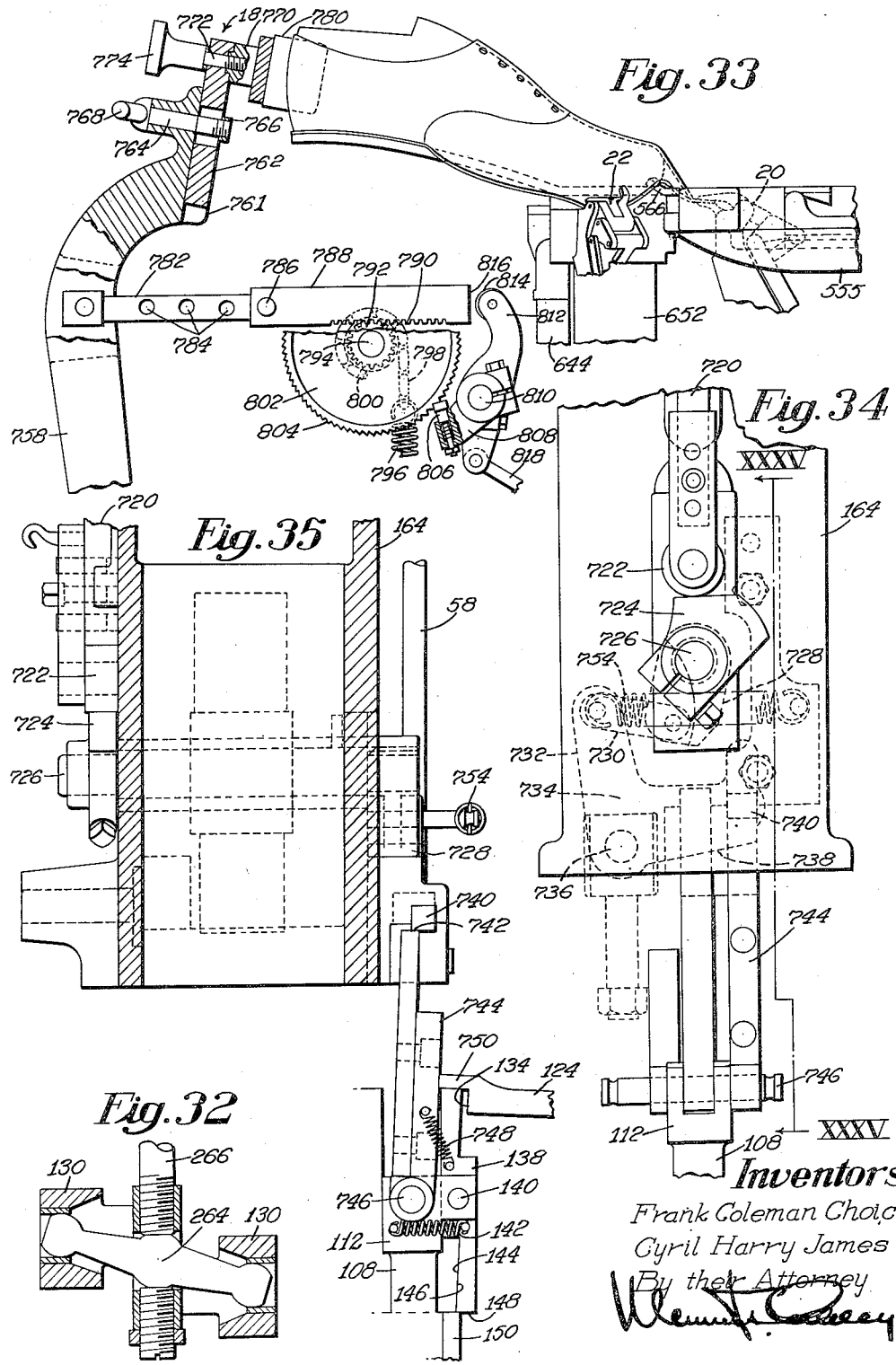

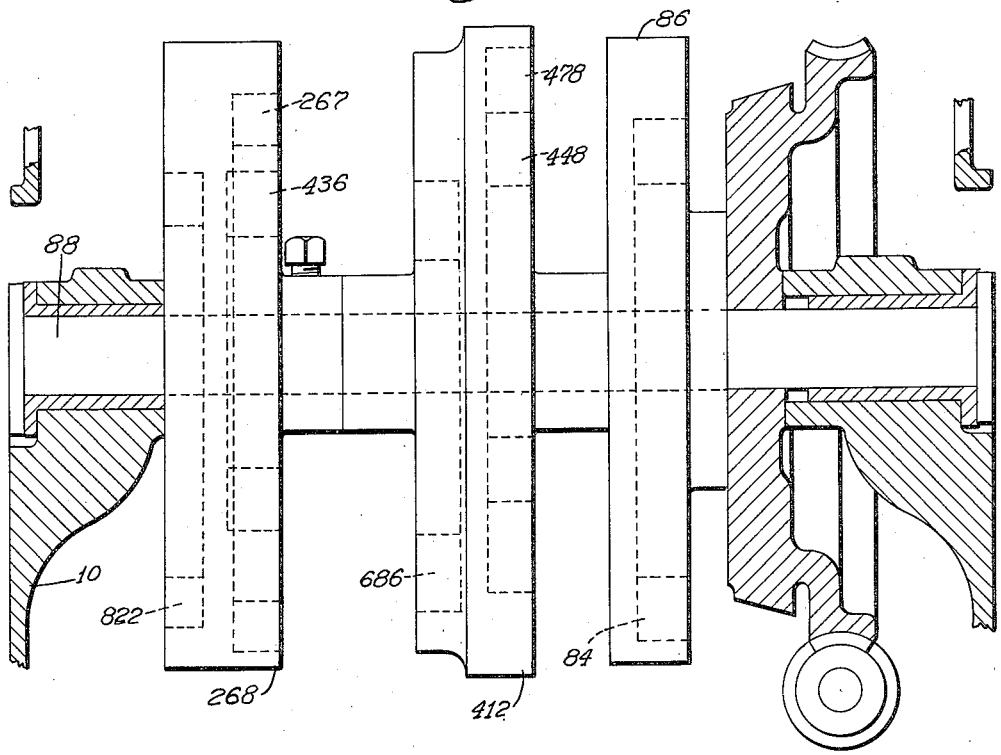

Inventors
Frank Coleman Choice
Cyril Harry James
By their Attorney

Patented Oct. 10, 1950

2,524,882

UNITED STATES PATENT OFFICE 2,524,882

END LASTING MACHINE FOR STITCHDOWN SHOES

Frank Coleman Choice and Cyril Harry James, Leicester, England, assignors to United Shoe Machinery Corporation, Flemington, N. J., a corporation of New Jersey Application March 21, 1947, Serial No. 736,300
In Great Britain March 29, 1946

32 Claims. (Cl. 12—7.8)

This invention relates to machines for working uppers over lasts and particularly to machines for pulling over and lasting the toe portions of stitchdown shoes.

Such a machine is shown and described in United States Letters Patent No. 2,152,855, granted April 4, 1939, upon an application of Ricks, Boothroyd and James and it is an object of the present invention to improve this machine in several aspects to provide for smoother operation and greater efficiency without sacrificing any of the features and advantages of that machine.

In the aforementioned machine the shoe to be lasted is assembled on a last, is placed in an upright position on a shoe support adapted to receive the forepart of the bottom of the shoe, and toe-end and side grippers are then caused to grip the margin of the upper and to pull it downwardly and outwardly to tension it over the toe end of the shoe. While the upper is thus held under the tension, toe-embracing wipers are moved forwardly from a retracted inoperative position to an operative position above the shoe on the shoe support and then are moved downwardly and inwardly by power to wipe the upper snugly about the toe-end of the shoe and to tuck the marginal portion into the crease between the under side of the last and the outstanding marginal portion of the sole.

Gripper release mechanism is included in the aforesaid machine which is actuated by the wipers as they descend in their downwiping movement to cause the grippers to release the upper at about the time the wipers reach the level of the sole just prior to their in-wiping movement to allow the upper to be withdrawn from the grippers and to be tucked into the crease between the bottom of the last and the marginal edge of the sole. A complete release of the upper material by the grippers at this time, however, results in considerable loss of control of the upper even though it is held between the wipers and the sides of the last due to the fact that the wipers do not positively grip the upper this being especially notable as the wipers move inwardly in their crease forming action. Hence, in the present machine invention resides in one aspect in means for automatically releasing the grip of the grippers on the upper material as the wipers approach in their down-wiping movement the level of the sole to release the marginal edge of the upper followed by a regripping of the upper at points further down on the marginal edge thereby allowing sufficient upper material to slip through the jaws of the grippers so that the wipers will not meet undue opposition during their crease forming action and yet retaining sufficient tension in the upper to insure complete control thereof during the crease forming operation. To accomplish this each gripper comprises a fixed jaw and a movable jaw mounted on a casing, the movable jaw and casing being yieldably connected by linkage to power operated means for closing the movable jaw toward the fixed jaw to clamp the marginal edge of the upper between them and thereafter moving the carrier and hence, the closed jaws downwardly to tension the upper and for holding them in a down drawn position to maintain the upper in a tensioned condition in readiness for the wiping operation.

The movable jaw is closed toward the fixed jaw to clamp the upper material by the initial movement of the linkage, a member of which is moved thereby relative to the casing, into engagement with one end of a lever pivoted on the casing the other end of which is connected by way of a toggle means normally held in a straightened position to the movable jaw. During closing movement of the movable jaw the fixed jaw is supported against heightwise movement by spring means bearing against the under side of the casing. As soon as the movable jaw is closed against the upper material on the fixed jaw the lever being directly connected thereto is restrained from further movement and hence, becomes an abutment limiting further relative movement of the aforesaid member in the casing so that further movement of the linkage downward draws the casing and the closed jaws downwardly to impart tension to the upper, the casing and jaws being held in their down drawing position by reason of the design of a cam which operates the linkage and in this position being constantly urged downward to preserve the tension by the aforesaid yieldable means. The release of the movable jaws, after the casing and closed grippers have been drawn down and are holding the upper under tension, is accomplished by fingers mounted on the casing and connected to the toggles, the fingers being located above the movable jaws in a position to be engaged by the down wiping movement of the wipers and by depression to break the toggle and hence, to move the one end of the lever out of engagement with the aforesaid member of the linkage and simultaneously to lock the member against movement relative to the casing. Disengagement of the one end of the lever and the aforesaid member frees the movable jaw from direct connection with the lever so that its grip on the upper material is released whereupon the yieldable means will pull the casing and the released jaws further down, the upper at this time slipping between the jaws. As the carrier and grippers are drawn downwardly, however, the aforesaid fingers move out of engagement with the wipers whereupon spring means acts simultaneously to unlock the member and return the toggle means to a straightened positioned whereupon the movable jaws are then caused to again grip the upper material, by reason of re-engagement of the member with the lever, but at points somewhat further down on the marginal edge of the upper.

The spacing of the wipers must be varied to take care of different widths and styles of shoes and in the aforesaid machine the wipers must be brought forward from their inoperative position to a position above the shoe support and adjusted by rotation of a hand wheel provided for that purpose to the correct spacing for a given shoe by setting the wipers opposite the sides of the last as it rests on the support. In bringing the wipers forward the machine is caused to move through part of its operating cycle and its construction is such that the wipers cannot then be returned to their inoperative position in readiness to commence a power operated wiping action on the shoe without having the machine continue through the remainder of its normal cycle of operation. The necessity for causing the machine to go through a complete cycle of operation merely for the purpose of adjusting the wipers is awkward and necessitates a wasteful operation of the machine. Hence another feature of the present invention resides in adjusting means including a visual indicator for adjusting the initial spacing of the wipers while withdrawn to an inoperative position without necessitating operation of the machine through any part of its cycle of operation, the adjusting means being so constructed that forward movement of the wipers to an operative position, preparatory to their down wiping movement under power, will not affect the adjusted spacing of the wipers. As illustrated the visual means comprises an annular member having graduations thereon and a disk having an arrow embossed thereon arranged to be rotated by the adjusting means to move the arrow along the graduations. The graduations are calibrated so that movement of the arrow from one graduation to the next by adjustment of the adjusting means will indicate that the spacing of the wipers has been varied by an amount corresponding to one shoe size. The aforesaid annular member has several scales of graduations for different styles of shoes and is arranged to be rotated relative to a fixed zero reference mark embossed on an adjacent part of a support for the indicator mechanism to bring the graduation of the particular scale, which corresponds to the size and style wipers employed at any given time, opposite the fixed zero reference mark whereupon when the wipers are adjusted by the adjusting means until the arrow is moved to a position opposite the selected graduation and the reference mark, the wipers will be open to a size corresponding to the graduation mark to which the arrow is directed. A shoe as much as two sizes smaller or larger may be satisfactorily wiped without changing the wiper plates by adjusting the spacing of the wipers until the arrow points to the graduation on the annular member to one side or the other of the graduation opposite the fixed zero reference mark which represents the size shoe to be operated upon. There may be variations in the thickness of the upper leather, hence there are additional fixed reference marks at either side of the aforesaid fixed zero reference mark on the adjacent portions of the support representative of different thicknesses of upper material and by rotation of the aforesaid annular member to bring the selected graduation opposite the particular reference mark which represents the thickness of the upper material and then rotating the arrow to bring it opposite the selected graduation as reset by rotation of the annular member the wipers will be spaced not only correctly for the size shoe but also to compensate for the thickness of the upper material.

As illustrated the adjusting means comprises a spindle connected by way of gears to the disk having the arrow thereon, the gears being of such ratio that the disk and hence, the arrow is rotated an amount which is proportional to the rotation of the spindle. The spindle is threaded and forms a connection between the ends of a pair of arms and an end of a third arm, the opposite ends of which are pivotally mounted for movement bodily with the wipers from their inoperative to their operative position. The third arm is held from relative movement about its pivot, while the wipers are in their inoperative positions and during their forward movement to an operative position, so that rotation of the spindle will cause relative movement between the ends of the pair of arms and the third arm and by reason of the fact that the latter is fixed cause the pair of arms to turn about their lower pivoted ends relative to the third arm. This movement of the pair of arms is communicated to the wipers in a manner to vary the spacing by an amount proportional to the rotation of the spindle by a pair of rods each of which is connected at one end to one of the wiper plates and at its opposite end to the midportion of one of the pair of arms. As illustrated the wipers are moved into and out of operative position by a carrier head upon which they are mounted and the aforesaid spindle and arms constituting the adjusting means and including the visual means are mounted for movement with the carrier head so that the relative position of the component parts is unaffected by the movement of the wipers into and out of operative position. There is, however, a link connected to the relatively fixed third arm which is operative when the wipers have been moved to their crease forming position to rotate this arm on its pivot and by such rotation to effect closing movement of the wipers, to tuck the upper into the crease, by way of the aforementioned spindle and pair of arms which pivot as a unit with the third arm.

There is also in the aforesaid machine toe positioning means adapted to embrace the toe end of the shoe to centralize it with respect to the wipers. As constructed in the aforesaid machine the positioning means engage the outer surface of the upper and hence, it is inevitable that some damage will be caused by the contact of the positioning means with the surface of the upper. To avoid this undesirable damage to the upper, invention herein also resides in toe positioning means arranged to engage the wood of the last underneath the upper material. As illustrated the positioning means comprises a pair of spaced fingers located and supported substantially on a level with the shoe supporting means having upwardly inclined end portions arranged to project inwardly over the shoe support to engage the wood of the last at about the upper edge of the beveled portion thereof defining the break between the walls and the bottom. The fingers are adjustable to and from each other so that they may be accommodated to the size shoe to be operated on, are adjustable as a whole width-wise of the shoe once they have been brought into engagement with the opposite sides of the last to centralize the last with respect to the wipers and are movable to a retracted out of the way position during the down wiping action of the wipers so that the upper may be wiped about the toe of the last. To this end the positioning means is arranged to be automatically withdrawn from the vicinity of the shoe support to an out of the way position by the same cam means that imparts down wiping movement of the wipers.

In the prior machine the gripping action for tensioning the upper over the toe of the last is afforded by toe end and side grippers which as heretofore pointed out release the upper at about the time the wipers begin their in-wiping crease forming action. While in the present machine as heretofore described the grippers do not entirely release the upper at the time the wipers begin their in-wiping movement the tension has been materially reduced by movement of the grippers to points lower down on the marginal edge of the upper. Hence, in another aspect the invention herein resides in means operable in conjunction with the wipers to grip the upper at points between the toe end and side grippers to supplement the tension afforded by the grippers and hence produce a more uniform tension on the upper during the in-wiping crease forming action. To accomplish this the aforesaid positioning means is first moved outwardly and downwardly by the aforementioned cam means to withdraw it from the support and to move it into a position to intercept the downwardly moving wipers thereby to press the upper material which lies above it into engagement with the under side of the wipers and thereafter while still moving outwardly the positioning means is forced further downward by the down-wiping movement of the wipers, which bear against the positioning means, against spring means which engage the under side of the positioning means yieldably to sustain it again downward movement. At approximately the level of the sole the wipers begin their in-wiping action and during this time the marginal edge of the upper is held against the under sides of the wipers by the positioning means which is yieldably held in engagement with the under side of the wipers by the aforementioned spring and hence tension is maintained in the upper material during the entire time that the wipers are tucking the upper into the crease.

The several aspects of the invention will now be described with reference to the accompanying drawings, in which:

Fig. 2 is an elevation partly in section of the rear end of the machine showing only that portion thereof which is above the main drive shaft;

Fig. 3 is a fragmentary portion viewed from the rear end of the machine at the top with the wiper adjusting means and visual indicator removed;

Fig. 4 is an elevational view of the right-hand side of the machine showing the details of the mechanism for actuating the shoe positioning fingers illustrating the fingers in their operative position in which they function as shoe positioning means;

Fig. 5 is a view similar to Fig. 4 showing the shoe positioning fingers partially withdrawn to an out of the way position for cooperation with the wipers;

Fig. 6 is a detail of the connection between the wiper carrier head and the wiper operating mechanism;

Fig. 7 is a section on the line VII—VII of Fig 6;

Fig. 8 is an elevation at the right-hand side of the machine showing the upper portion enlarged and partly in section to show the wiper adjusting mechanism;

Fig. 8a is a plan view of the visual indicating means;

Fig. 9 is a fragmentary view in elevation at the right-hand side of the machine showing the mechanism for advancing the wipers toward the toe end of the shoe to tuck the upper into the crease at the toe end of the shoe;

Fig. 10 is a plan view partly in section of the forward end of the wiper carrier head;

Fig. 11 is a front elevational view at the forward end of the wiper carrier head shown in Fig. 10;

Fig. 12 is a fragmentary view in elevation as seen from the left-hand side of the machine showing the mechanism for closing the wipers on the toe end of the shoe during their crease forming movement;

Fig. 13 is a section upon the line XIII—XIII of Fig. 12;

Fig. 14 is an enlarged view of the adjusting means for the wiper advancing and closing mechanism shown in Figs. 9 and 12.

Fig. 15 is a section on the line XV—XV of Fig. 14;

Fig. 16 is a plan view at the forward part of the machine showing the relative positions of the grippers, the shoe positioning means and the shoe support;

Fig. 17 is an elevation partly in section showing the details of one of the grippers and its actuating mechanism;

Fig. 18 is a vertical section in a plane extending from front to back showing the shoe support, its actuating mechanism and the casting at the forepart of the machine for housing the same;

Figure 37:
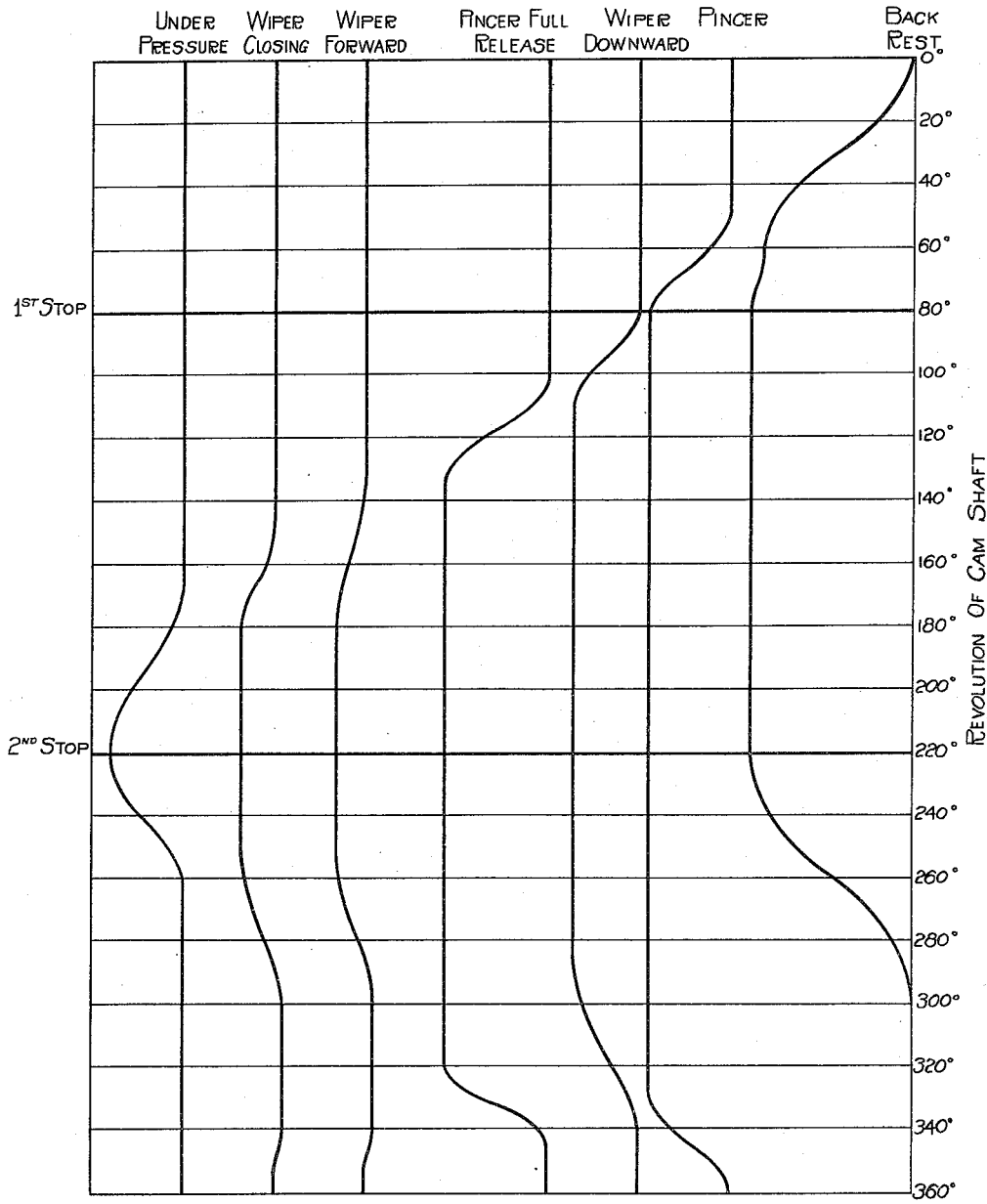

Figs. 19, 20, 21 and 22 illustrate various positions of one of the side grippers during the operation of the machine including the initial gripping of the marginal edge of the upper, the down drawn position in which the grippers hold the upper under tension, the regripped position on the upper at points lower down thereon at the time the wipers have moved into crease forming position and the completely released position of the grippers at the end of the crease forming operation;

Fig. 23 is a plan view of the details of the shoe positioning fingers and their adjusting mechanism;

Fig. 24 is a detail in side elevation at the base of the machine of the parts connecting the gripper down-drawing rods to their power operating means;

Fig. 25 is a front elevation of parts shown in Fig. 24;

Fig. 26 is a detail partly in section of the means for adjusting the side grippers longitudinally and transversely of the shoe support;

Fig. 27 is a plan view on the line XXVII—XXVII of Fig. 26;

Fig. 28 is an elevational view as seen from the right side of Fig. 26 showing details of the means for locking the grippers in their adjusted position;

Fig. 29 is an enlarged view of the arm at the lower end and rear side of the gripper actuating mechanism illustrated in Fig. 17;

Fig. 30 is a detail of the mechanism for connecting the hand levers to the toe end gripper down-drawing rod;

Fig. 31 is a detail of a flexible connection interposed in the toe end down-drawing rod;

Fig. 32 is a section of the line XXXII—XXXII of Fig. 24;

Fig. 33 is an elevation partly in section at the forward part of the machine showing the heel end supporting mechanism;

Fig. 34 is an elevation showing the details of the mechanism for moving the shoe support heightwise;

Fig. 35 is a section on the line XXXV—XXXV of Fig. 34;

Fig. 36 is a view transversely at the base of the machine showing the main shaft and the cams for operating the various mechanism; and Fig. 37 is a cam chart of the machine.

The present machine is generally similar in construction and in its mode of operation to the machine illustrated and claimed in the above mentioned patent and as in that machine consists of two substantially separate units which are identical except that the wipers of one unit are adapted for operation on left shoes and the other on right shoes, the units being placed side by side in positions to receive power from a common source. The following description will, therefore, apply to either unit and hence only one unit will be illustrated herein.

Each machine (Fig. 1) has a base 10 and a head casting 12 having spaced parallel walls between which are mounted in operating relationship to each other, a shoe supporting device (Fig. 18) consisting of a center portion 14 and a surrounding portion 16 for supporting the forepart of the shoe, a heel embracing member 18 (Fig. 33) for sustaining the heel end of the shoe, toe-end and side grippers 20 and 22 (Fig. 16) for pulling the upper taut over the last, toe embracing wipers 24 (Fig. 10) for wiping the upper downwardly about the toe-end of the shoe and tucking the marginal portion thereof into the crease between the last and the margin of the sole, and shoe positioning means 23 (Fig. 23) for centering the last and hence the shoe with respect to the wipers. These parts are similar to but are operated by mechanism different from that disclosed in the above mentioned patent.

*The grippers*

The grippers for pulling the upper over the last prior to the wiping action which, as indicated heretofore, consist of toe-end and side grippers 20 and 22, occupy an inoperative raised position (Figs. 16 and 17) when the machine is at rest adjacent to the peripheral edge of the surrounding portion 16 of the shoe support, which corresponds generally in shape to the forepart of the shoe bottom, and are somewhat above the same to clear the upper edge of the marginal portion of the sole of a shoe resting upright on the center portion 14 of the support. The grippers are so constructed and operated that they impart downward and outward movement to the marginal edge of the upper in a direction to pull the forepart of the upper firmly down over the toe of the last and lengthwise thereof to cause the upper to hug the sides of the last. This lengthwise movement is provided by movement of the side grippers at an angle of approximately 15° away from a purely transverse movement as will appear hereinafter. Each gripper, as shown in Figs. 17 and 19 to 22 inclusive, comprises upper and lower gripper jaws 28 and 30. The lower gripper jaws 30 is fixed between the opposite walls of a channel shaped casing 32, the lower portion of the latter being slidably mounted within a sleeve 34 (Figs. 17 and 26) for movement in a substantially vertical direction. The upper gripper jaw 28 is pivotally mounted on a pin 36 fixed between a pair of spaced ears 38 formed integral with the casing 32 and extending upwardly and rearwardly from the lower jaw. Integral with the upper jaw and extending rearwardly of the pin 36 is an arm 40, the end portion of which is pivotally connected to the midportion of a lever 42 by means of which the upper jaw may be caused to close against upper material resting on the lower jaw as will appear. To limit the opening of the upper jaw with respect to the lower jaw, the arm 40 has a downwardly projecting abutment having a substantially vertical face 44 (Fig. 17) arranged to engage a substantially vertical face 46 formed on the casing rearwardly of the lower jaw. The upper end of the lever 42 is pivotally connected to one end of a toggle lever 48 which is connected between its ends to one end of a toggle link 50. The other end of the toggle link 50 is pivoted on the aforementioned pin 36. The other end of the toggle lever 48 is pivotally connected between the upper ends of a pair of rods 52 which serve, as will be hereinafter described, to maintain the toggle lever 48 and toggle link 50 in a normally straightened position. The lower end of the lever 42 extends inwardly between the walls of the casing 32 and has a toe portion 54 (Fig. 17) which lies beneath a cam plate 56 which is secured to the upper end portion of a gripper down-drawing rod 58 slidably mounted in the channel of the casing 32. Downward movement of the down-drawing rod 58 will move the surface of the cam plate 56 relative to the toe 54 thereby pushing it and hence the lower end of the lever 42 rearwardly. Since the toggle members 48 and 50 are maintained in a straightened position by the rods 52 the rearward movement of the lever 42 causes the entire linkage to pivot on the pin 36 which lifts the rearwardly extending arm 40 and hence causes closing movement of the upper gripper jaw 28 about its pivot pin 36 toward the lower jaw 30. When the jaws are closed the lever 42 is prevented from any further rearward movement by reason of its direct connection to the upper jaw, hence it acts as an abutment against which the cam plate 56 is brought by the downward pull on the rod 58 so that relative movement of the rod 58 in the casing is prevented. Further downward movement of the rod 58 therefore serves to draw the casing and gripper downwardly. As is illustrated the cam plate 56 has two faces 60 and 62 inclined at different angles with respect to the axis of the down-drawing rod 58, the face 60 being at substantially 15° and the face 62 being at substantially 80° to a line normal to the axis of the rod 58. The comparatively flat angle of the face 60 when brought into contact with the toe 54 of the lever 42 displaces the latter rapidly for comparatively small downward movement of the rod 58 and hence causes the upper jaw to close rapidly on the upper material which lies over the lower jaw to grip the material during the initial downward movement of the rod 58. As the rods 58 descend, however, and begin to pull the grippers down, the grip must be increased to prevent the marginal edge of the upper from pulling from between the jaws with the increase in tension and to insure pulling the upper taut. This is accomplished by the provision of the cam face 62 which is brought into engagement with the toe 54 of the lever 42 by somewhat further relative movement between the down-drawing rod and the toe of the lever as the grippers move downwardly and will displace the lever a small amount for large increments of downward movement of the rod 58, and hence greatly increase the gripping action of the jaws.

During the initial gripping action the lower jaw 30 is yieldably supported from downward movement, until the upper jaw 28 has firmly pressed the marginal portion of the upper into engagement therewith to establish a firm grip on the upper so that it will not subsequently be pulled from between the jaws by the downward movement of the closed jaws under power during the tensioning of the upper, by a pair of upwardly extending spring-pressed plungers 63 (Fig. 8) which are mounted below the gripper jaws on the sleeve 34 and engage lateral shoulders 65 formed on the casing 32.

To provide for downward movement of the side grippers 22 to impart tension to the upper material the lower end of each of the down-drawing rods 58 for the two side grippers are pivotally connected by means of trunnions to the opposite ends of a horizontally disposed arm 64 (Fig. 25) which in turn is pivotally attached at 66 to the upper bifurcated end 70 of a stem 72, the latter being mounted for slidable movement in a block 74 (Figs. 24 and 25). The block 74 is in turn arranged to slide linearly in a direction along the axis of the rods 58 in ways formed in the frame of the machine and linear movement is imparted to it by an arm 76 one end of which is bifurcated to embrace the block and is pivotally connected thereto. The arm 76 is supported between its ends for rocking movement on a shaft 78 extending transversely of the machine and is connected at its opposite end to the lower end of a cam operated rod 80 (Fig. 24) which extends upwardly and is connected to a cam arm 82 (Fig. 1) arranged to be power operated through connections with a cam groove 84 formed in one face of a cam 86 mounted on the main shaft 88 of the machine (Fig. 36). A pair of tension springs 90 are coupled to the upper end 70 of the stem 72 (Figs. 24 and 25) and extend downwardly parallel to the stem and are secured at their lower ends between a pair of arms 92 pivoted at 94 to the lower end of the block 74. These springs serve normally to hold the upper bifurcated end 70 of the stem 72, which has a laterally extending shoulder 96 at its under side, against a laterally extending shoulder 98 on the block 74 thereby affording a yieldable connection between the gripper down-drawing rod and the power operated cam on the main shaft. The tension of the aforesaid springs 90 may be varied by adjustment of the arms 92 which is accomplished by securing between their free ends a sleeve 97, the latter being internally threaded at 99 to receive the threaded end 100 of a spindle 102. The spindle 102 is secured from longitudinal movement between ears 104 projecting laterally from the block 74 and hence rotation of the spindle 102 by means of a head 106 at its upper end will produce relative movement between the spindle and sleeve to vary the position of the levers 92 on the pivot 94.

The down-drawing rod 58 for the toe-end gripper 20 is also connected to the block 74 but by way of a stem 108 (Fig. 24) which is housed for sliding movement in the block parallel to the stem 72 and this stem is drawn downwardly by a pair of springs 110, the upper ends of which are attached to the head portion 112 (Fig. 34) of the stem and the lower ends of which are attached to a pair of levers 114 (Fig. 24) also pivoted at 94 to the lower end of the block 74. The springs 110 for the stem 108 are adjustable in tension similarly to those previously described for the stem 72 and hence will not be described in detail herein. The down-drawing action of the springs 110 on the stem 108 and hence the rod 58 for the toe-end gripper is resisted by engagement of a latch means carried by the head portion 112 of the stem, the purpose of which will appear hereinafter, with a ledge on the block and hence as is the case of the side grippers the springs provide a yieldable connection between the toe-end gripper and the power operated cam on the main shaft.

The downward movement of the block 74 will impart downward movement to all three of the gripper actuating rods 58 through their respective springs 90 and 110 simultaneously. However, it is desirable to exert tension on the end portion of the upper by way of the toe-end gripper prior to the tensioning of the side portions of the upper to secure the best results in pulling the upper over the toe and causing it to conform thereto. Hence, means is provided for causing the toe-end gripper to grip the toe end of the upper and draw it downwardly prior to the power operated downward movement of the side grippers and independently thereof. To accomplish this there is provided at the forepart of the machine a knee operated pad 113 (Fig. 1) for actuation by the operator to draw the stem 108 downwardly in the block 74 and hence first to close the upper jaw 28 of the toe-end gripper 20 on the marginal portion of the upper material and then to draw the closed jaws 28 and 30 downwardly to impart an initial tension thereto. As illustrated the knee pad 113 is connected to a link 115 which in turn is fixed to the upper end of an arm 116 pivoted at its lower end on a pin 118 in the base 10 of the machine. Near the lower end of the arm 116 is attached one end of a substantially horizontal rod 120 which extends rearwardly and is attached at its opposite end to a bell crank lever 122 (Fig. 24) the latter being pivotally mounted between its ends on the shaft 78. The opposite end of the bell crank lever 122 has connected thereto a latch releasing member 124 which extends forwardly therefrom and is supported near its free end by a pin 126 extending between a pair of downwardly projecting ears 128 formed on the under side of a pair of arms 130, the purpose of which will appear hereinafter. The arm 130 is pivotally supported for rocking movement between its ends on a shaft 132 substantially directly above the pin 126 and hence, rocking movement of the arm 130 will not disturb in any substantial degree the heightwise position of the pin 126 with the result that the latch releasing member 124 will be undisturbed by rocking movement of the arm 130. Near the forward end of the latch releasing member 124 there is a shoulder 134 which lies close to the upper end 136 of a latch 138, the latch being pivotally mounted on a pin 140 (Figs. 24 and 35) secured in the head portion 112 of the stem 108. A light spring 142 connected at its opposite ends to the head 112 and the lower portion of the latch 138 holds the latch so that it is substantially parallel to the axis of the stem 108 with its rear face 144 in engagement with a face 146 on the head 112. In this position the lower end face 148 of the latch 138 engages the upper face of a hardened block 150 set into the side of the block 74. As thus constructed, when the machine is at rest, the latch 138 holds the stem 108 in a raised position against the down-drawing action of the springs 110 and hence the toe-end gripper 20 rests in an inoperative position together with the side grippers 22 above the shoe support in readiness for gripping action. To accomplish tensioning of the toe portion of the upper prior to the tensioning of the side grippers, therefore, the operator presses inwardly on the knee pad 113 which through the aforesaid mechanism causes the latch releasing member 134 to tilt the latch 138 in a counterclockwise direction about its pivot 140 thereby disengaging its lower end 148 from the block 150 and releasing the stem 108 whereupon the springs 110 immediately draw the stem 108 downwardly and together with it the toe-end gripper downdrawing rod 58 which will, as heretofore described, first close the upper jaw 28 of the toe-end gripper on the lower jaw 30 and then draw the gripper downwardly to impart a light tension to the upper at the toe end thereof. Consequently when the side grippers are subsequently drawn downwardly under power operation to impart tension to the side portions of the upper, the upper material at the toe end thereof will already be under some tension.

To provide for the aforementioned tensioning of the upper to cause it to hug the sides of the last, each side gripper 22 is supported (Fig. 26) by a channel shaped bracket 152, the opposite walls 154 of which (Figs. 26 and 27) extend outwardly and are inclined at an angle of about 15° to a line extending widthwise of the machine. The sleeve 34 is pivotally mounted on a pin 156 extending between the walls 154 of the bracket 152 to permit outward swinging movement of the grippers and, since the casing 32 can slide within the sleeve 34, heightwise movement of the grippers is thereby permitted. For causing outward movement of the grippers as they descend the casing 32 is provided on its inner side with a wedge shaped surface 158 (Fig. 17) extending substantially axially of the casing which is held by means of a spring 159 (Fig. 26) in engagement with a cam roll 160 (Figs. 17 and 27) adjustably mounted on the upper end of the bracket 152.

To allow for adjustment of the side grippers 22 longitudinally of the shoe support for shoes of different sizes, the bracket 152 for each gripper is mounted (Fig. 26) for forward and rearward movement in a horizontal guideway 162 recessed into the side walls of an inclined casting 164 (Fig. 1) formed integral with the machine frame in which the shoe supporting means is mounted as will appear hereinafter, for the reception of a T-shaped head 166 formed on an extension at the inside of the bracket 152. The T-shaped head is held in the guideway 162 so as to support the bracket 152 for sliding movement by a pair of cover plates 168 and 170 secured to the wall of the casting 164 so as to overlie the end portion of the T-shaped head. The upper one of the cover plates 168 as shown in Fig. 28 is provided with serrations 172 which may be engaged by a detent 174 fixed to the rear end of a handle 176 pivoted on the bracket 152. With the aforesaid construction the bracket may be adjusted to occupy any given position by tilting the handle 176 so as to withdraw the detent 174 from the one of the serrations 172 it occupies, moving the bracket to the desired longitudinal position and locking it in the selected position by entering the detent in engagement with the serration opposite it at that point. The detent will normally be held in engagement with a selected serration by reason of the weight of the handle 176.

Widthwise adjustment of the side grippers 22 for shoes of different sizes is accomplished by adjustment of the position of the cam roll 160 heretofore referred to which, as shown in Fig. 27, is fixed to a spindle 178, the latter being mounted at one end on a pin 180 set into the upper end of the bracket 152 and pivotally connected at its opposite end by a pin 182 to a spindle 184. This latter spindle 184 has a threaded end 186 which passes through a boss 188 fixed to the upper surface of the bracket 152, and a thumb nut 190 on the threaded end outwardly of the boss provides means for moving the spindle 184 longitudinally with respect to the boss and hence for varying the lateral position of the cam roll 160 substantially widthwise of the shoe.

The toe-end gripper 20 is supported in a manner similar to the side grippers and hence will not be described herein. No provision for inward or outward adjustment of the toe-end gripper is, however, necessary or provided for.

After the margin of the upper has been gripped by the toe-end and side grippers and the machine has been set in operation to apply downward and outward tensioning movement to the grippers, it comes to rest with the upper under tension before the wipers commence their down wiping and crease forming movement. During this period of rest between the tensioning and wiping actions it is desirable to provide means to permit the operator to adjust the upper on the last while under tension to increase or decrease the pull of the grippers; to cause the opposite side grippers to move the upper bodily over the last to centralize it with respect to the last if it is not already correctly positioned and to cause the grippers completely to release the upper and, if the operator is not satisfied that it is correctly tensioned by the grippers and cannot correct it by means of the aforesaid adjustments, to return the grippers to their initial position without allowing the wipers to act on the upper and hence without going through the complete cycle of operation of the machine. For the foregoing purposes the machine is provided (Fig. 1) with a handle 192 at the left side of the machine for adjusting the tension of the toe-end gripper, with a pair of handles 194 positioned centrally of the machine for increasing or decreasing the pull of the side grippers, a pair of handles 196 positioned at opposite sides of the machine for causing one of the side grippers to move upwardly and the other downwardly simultaneously and treadles 198 and 200 inter-operable to initiate operation of the machine, to restore all of the grippers to their initial inoperative position after having completed their upper tensioning action if it is decided that a re-gripping of the upper should be tried before wiping action is commenced or to continue operation of the machine to complete its cycle of operation.

As illustrated herein the aforesaid hand levers are actuated to accomplish the above as follows.

The hand lever 192 at the left of the machine is pivoted on a shaft 202 (Fig. 30) supported in the side walls of the machine frame and has a rearwardly extending portion 204 connected by a sleeve 206 formed integral therewith and extending laterally therefrom to a second lever 208 which in turn is pivotally mounted on the shaft 202 and has a forwardly extending portion 210. The end of the forwardly extending portion 210 is enlarged and bifurcated to embrace a U-shaped member 212 (Figs. 30 and 31) pivotally supported on pins 214 extending inwardly of the branches of the bifurcation. The U-shaped member 212 in turn embraces a cylindrical head 216 which is secured to the lower end of the toe-end gripper down-drawing rod 58 by a threaded stud 218. Longitudinal movement of the head 216 relative to the U-shaped member 212 is restrained by plates 220 which are secured at the opposite ends of the head and overlie the opposite sides of the U-shaped member 212. The upper plate 220 is secured in place by the threaded stud 218 at the upper end of the head which passes through the plate. The lower plate is secured to the under side of the head by a threaded stud 222 which forms part of a ball joint 224 which serves to join the interrupted ends of the gripper down-drawing rod 58 at this point. It is evident from the aforesaid construction that depression of the hand lever 192 will through the mechanism just referred to depress the toe-end gripper down-drawing rod 58 independently of the power operated means and hence increase the tension in the upper at the toe end of the shoe.

The hand levers 194 for increasing or decreasing the pull of the side grippers 22 are connected for pivotal movement to a horizontal shaft 226 (Fig. 1) by a forwardly extending arm 228, the forward end of which is attached to the upper end of a rod 230. The lower end of the rod 230 (Fig. 24) is connected to a U-shaped lever 232 by means of a pin 234 fixed in the lower end of the rod 230 on which there is mounted a roll 235, the latter lying between a pair of ears 236 formed on the forward side of the stem 72. The rear ends of the U-shaped levers 232 are pivoted to the branches of the bifurcated forward end of the lever 76. Downward movement of the hand levers 194 will therefore be transmitted through the rod 230, to the stem 72 to cause both side grippers to move downwardly by equal amounts.

The hand levers 196 for causing one side gripper to move up and the other a corresponding amount down are also pivotally mounted on the shaft 202 only one of which is shown in Fig. 30. Each hand lever has a downwardly extending portion 238 (Fig. 1) to the lower end of which is pivotally secured a rod 240. The lower ends of the rods 240 are pivotally secured by way of trunnions to the opposite ends of the arm 64 (Fig. 25). Hence by movement of one of the hand levers 196 downwardly and the other upwardly or vice versa the arm 64 may be tilted in one direction or the other about its pivot 66 to the upper end of the stem 72 with the result that one of the side gripper down-drawing rods 58 will be drawn downwardly and the other will be moved upwardly thereby bodily drawing the upper material transversely of the last.

In order completely to release all of the grippers after the upper has been tensioned over the last and before the wipers have acted upon the upper the treadle 198 (Fig. 1), which by depression sets into operation the power operated mechanism for causing the side grippers to grip the upper and draw them and the toe-end gripper downwardly to impart tension to the upper, is constructed so that repeated depression thereof will restore the grippers to their initial position. The specific details of the aforesaid treadle operated mechanism for accomplishing this are not illustrated herein.

After the grippers have been caused satisfactorily to tension the upper over the last the wipers are brought into operation as will appear hereinafter. As the wipers approach the lower part of their down wiping action, however, it is desirable that the toe-end gripper should first completely release the toe portion of the upper followed by a partial release of the upper by the side grippers, a regripping and then a complete release. To accomplish release of each of the grippers the rods 52 (Fig. 17) for each gripper which control the toggle members 48 and 50 through which the upper jaw 28 is swung down into engagement with the lower jaw 30, extend downwardly and are connected at their lower ends to a bracket 242 (Figs. 17 and 29) pivotally mounted on the sleeve 34. Extending forwardly of the bracket are a pair of ears (not shown) between which there is fixed a transverse pin 246 on which there is pivotally mounted a locking plate 248. The rear end of the locking plate 248 is held between a spring pressed plunger 250 and an adjustable stop screw 252 carried by the bracket 242. The forward end of the locking plate has a flattened face 254 beveled at its opposite corners and is adapted to engage a flat surface 256 formed on one side of the rod 58. Also extending forwardly of the bracket 242 is an arm 258 which as shown in Fig. 29 has connected thereto a rod 260 the upper end of which has a ball head 262 seated in a recess 263 formed in the end portion of the arm. As will be seen by reference to Fig. 17 when the bracket 242 occupies a substantially horizontal position the locking plate 248 occupies a substantially horizontal position with its end face 254 parallel with the flat surface 256 on the rod 58 and hence the rod 58 is free to slide relative to the locking plate. Cam means is provided, however, for rocking the bracket 242 by way of the rod 260 connected thereto in a counterclockwise direction so as to rotate the locking plate 248 to bring one of its beveled corners into engagement with the flat surface 256 on the rod 58 thereby to lock the rod from longitudinal movement relative to the gripper casing 32. Continued upward movement of the bracket against the spring-pressed plunger 250 will then through the rods 52, break the toggle members 48 and 50 upwardly thereby swinging the toe 54 of its lever 42 away from contact with the wedge plate 56. Since the wedge plate 56 is attached to the rod 58 and hence cannot move downwardly under the tension of the springs 98 or 110 as the case may be it is therefore prevented from acting on the toe 54 of the lever 42 which is moved out of the path of the cam by the breaking of the toggle so that no thrust can be imparted to the lever 42 and consequently the upper jaw 28 is released. The extent of the release of the upper jaw will depend upon the amount of upward thrust on the bracket 242. Complete release of the upper material by the side grippers is brought about at the proper time in the operation of the machine by a cam actuation of the aforesaid rods 260. To this end the rods 260 which are connected to the side grippers are connected at their lower ends to the forward ends of the arms 130. The rear ends of the arms 130 are coupled to the opposite ends of a lever 264 (Fig. 32) which in turn is connected between its ends to the lower end of a rod 266. The rod 266 is connected for actuation to a cam lever which follows a cam groove 267 formed in one face of a cam 268 (Fig. 36) secured on the main shaft 38 of the machine. Complete release of the side grippers need not be effected until the wipers have completed their creasing action and this is taken care of by the design of the cam track.

To effect complete release of the toe-end gripper the lower end of the rod 269 which is connected to the toe-end gripper is connected through suitable linkage, not shown, to the wiper actuating members so that when the wipers have moved downwardly to a point substantially opposite the upper edge of the beveled face of the last the bracket 242 of the toe-end gripper will be swung upwardly to release the upper jaw 28. The complete release of the toe-end of the upper will make it easier for the wipers to tuck the upper material in at the toe portion of the shoe and since the upper material, as will subsequently appear, will be still held under tension by the wipers, in cooperation with other means hereinafter referred to, it will at all times be under control. When the toe-end gripper releases the upper material it will be drawn to an out of the way position by its springs 110 (Fig. 24).

One of the important objects of the present invention is to provide a partial release and regripping of the upper material by the side grippers 22 prior to complete release of the upper material especially when the upper material is heavy and the down drawn springs 90 do not afford sufficient tension to pull the grippers below the normal path of movement of the wipers as they begin to move inwardly to tuck the upper into the crease between the last and the sole. If such a condition occurred the wipers would it is true contact the top of the grippers and push them downwardly out of the way. However, the increased tension imparted to the upper might be so great that the wipers would then be unable properly to tuck the upper material into the crease. Hence each side gripper is provided with a finger 270 (Figs. 17 and 22) which is formed integral with and extends upwardly from the toggle link 50 above the upper gripper jaw 28 so that the wipers in their down wiping action will contact the fingers prior to contacting the upper jaws as they approach the point in their movement where they begin in-wiping action. Since the fingers 270 form a continuation of the toggle links 50 pressure exerted on their free ends will rock the links 50 on their pins 36 and break the straight line position of the toggle members 48 and 50 upwardly as shown in Figs. 21 and 22. This draws the rods 52 upwardly which again cause the locking plates 246 to lock the rods 58 against longitudinal movement relative to their casings 32 and hence release the upper jaws 28 as heretofore described so that the upper material may slip through the jaws. Release of the upper jaws 28 from the upper material permits the down drawing springs 90, however, to move the side grippers downwardly at a rate which exceeds the down wiping movement of the wipers with the result that the fingers 270 move out of contact with the wipers whereupon the toggle members 48 and 50 resume their straightened position by reason of the action of the spring-pressed plungers 256. The rods 58 are therefore released and the upper jaws 28 are again caused to engage the upper material by the action of the cam plates 56 to regrip it so that during the actual tucking in of the upper material by the wipers the marginal portion of the upper material is still held although under a reduced tension by the side grippers to insure an unwrinkled and taut condition.

Wipers

The toe embracing wipers 24 in the illustrated machine are arranged while the aforesaid three grippers are holding the upper in a tensioned and out-spread condition to move forwardly over and then downwardly around the toe portion of the last to shape the upper thereto and having descended to a position in which their under faces lie at least in the same plane as the last bottom to advance and close somewhat to force the upper into the angle between the sides of the last and the outwardly projecting margin of the sole to form a well defined crease.

To facilitate positioning of the margin of the shoe upper between the jaws of the grippers and inspection of the results of the upper-pulling action of the grippers as well as to provide clearance for toe end positioning means which is to be described hereinafter the wipers are arranged to occupy a raised and rearwardly retracted position away from the toe of the shoe until such time as the operator wishes to bring them forward over the shoe in readiness for down wiping action.

To accomplish the aforesaid movement of the wipers 24 the machine is provided with a wiper carrier head 272 (Figs. 1, 8 and 10) which consists of a hollow tubular casting pivotally mounted at its rear end on a pair of horizontally disposed pins 274 (Figs. 2 and 3) fixed in the upper ends of a pair of spaced arms 276 formed on a yoke member 278. The yoke member is in turn mounted on a pair of horizontally disposed pins 280 fixed in the upper ends of spaced arms 282 formed on a yoke member 284 the latter being mounted for pivotal movement on a pair of horizontally disposed pins 286 fixed in the opposite side walls of the head casting 12. Forward movement of the wiper carrier head 272 from its inoperative remote position is accomplished through toggle links (Figs. 1 and 8) consisting of a link 288 pivotally secured to the rear of the yoke member 284 at one end and at its opposite end to a link 290 which is pivoted between its ends at 292 on the head casting. The rear end 294 of a link 290 is connected to the upper end of a treadle rod 296 the lower end of which is connected to an arm 297 (Fig. 24) pivoted on a shaft 299 and integral with an arm 301 which is connected by a link 303 to an arm 305 (Fig. 1) upstanding from the treadle 200 which is pivoted on a shaft 307. Downward movement of the treadle rod 296, by means of the aforesaid treadle 200, will therefore straighten the toggle links 288 and 290 and hence swing the yoke member 284 in a counterclockwise direction about its supporting pins 286 (Fig. 2). This imparts forward movement to the yoke 284 and hence forward movement to the yoke 278 to which the wiper carrier head 272 is pivoted with the result that the wiper carrier head is moved forwardly from its retracted, remote, inoperative position (Fig. 1) to a position directly above the shoe support in readiness for down wiping (Fig. 8). The yoke member 278 is held from idle movement about its pivots 280 with respect to the yoke member 284 so that it moves as a unit therewith by means of a connecting rod 298 (Figs. 1 and 2), attached at its upper end to a forwardly extending arm 300 of the yoke member 278 and at its lower end to power operated means which will be described hereinafter, the purpose of which is to move the wiper carrier head forwardly a short distance toward the toe end of the shoe when it reaches its lowermost down wiping position just prior to the closing of the wipers to tuck the margin of the upper material into the crease at the toe end of the shoe.

As thus mounted the down wiping action of the wipers is accomplished and controlled by means of a pair of plates 302 (Figs. 1, 4 and 5) which are pivotally mounted at their rear ends on horizontally disposed pins 304 secured in the head casting and at their forward ends to power operated links 306. The power operated means for imparting a downward movement to the links 306, and hence to the forward end of the wiper carrier head will be described hereinafter. Each plate 302 as will be seen by reference to Figs. 6 and 7 has an arcuate channel 308 in its inner surface adapted slidably to receive a block 310 pivotally fastened to the lower end of a strap 312 the opposite end of which is bolted to one side of the wiper carrier head 272. The arcuate channels 308 are of such design that they restrain the forward end of the wiper carrier head to a substantially linear path during forward movement of the wiper carrier head from its inoperative position to its operative position so that there is little or no heightwise movement thereof.

It is desirable that, as the wipers are advanced to tuck the upper into the crease between the bottom of the last and the flange of the sole, there be some yield between the wipers and their connection to the power operating means for so moving them to relieve any strain which might be put upon the parts or which might damage the shoe by unlooked for resistance opposing the forward movement of the wipers. Hence the wiper carrier head 272 is connected to the power operating means in a yieldable manner as follows. As shown in Fig. 8 the wiper carrier head 272 has a longitudinal bore 314 formed therein for the reception of an arbor 316 which is free to slide longitudinally in the bore. The rear end of the arbor 316 extends from the rear end of the wiper carrier head 272 and has bolted to its end face a bracket 318. The bracket 318 has projecting from its lower side a pair of ears 320 (Fig. 3) which are bored to receive the aforesaid pins 274. Between the ears 320 there is mounted a horizontally disposed rod 322 (Fig. 8) which is threaded at its forward end into a depending boss 324 formed on the under side of the wiper carrier head 272. The rod 322 extends freely through a web extending between the ears and is provided with a head 326 which engages the rear side thereof. Mounted on the rod 322 is a spring 328 which lies between the forward side of the web and the boss 324 so that forward motion imparted to the bracket 318 by movement of the yoke 284 about the pins 286 as heretofore described is transmitted to the wiper carrier head 272 by way of the spring 328 and slidable arbor 316. Hence resistance to forward movement of the wiper carrier head will be taken up by compression of the spring 328 so as to relieve any undue resistance to forward movement of the wiper carrier under power operation.

After the wipers complete their down wiping movement and have been moved inwardly into engagement with the shoe close to the crease between the bottom of the last and the margin of the sole they are moved toward each other to tuck the upper into the aforesaid crease along the sides of the toe portion. The movement of the wipers toward each other is accomplished as follows. Referring to Fig. 10 there is shown partly in section the forward part of the wiper carrier head 272. This forward part consists of an enlarged shallow casting 330 having formed in the end portion thereof and opening outwardly therefrom a substantially U-shaped recess 332 corresponding in contour to the toe end of a shoe. In the opposite sides of the casting inwardly of the U-shaped recess there are formed semi-circular grooves 334 in which there are disposed a pair of wiper carrier plates 336 which are substantially sector shaped and which are arranged to contact each other substantially where their radial edges meet. The forward opposite edges of the carrier plates are cut to correspond to the curvature of the U-shaped recess 332 and hence as they move toward each other around their point of contact their forward edges approach each other in such a manner as always to conform substantially to the shape of the toe portion of a shoe bottom. Each carrier plate 336 has a pair of slots 338 and 340 therein for the reception of cam rolls 342 and 344. The cam rolls 342 are mounted for free rotation on pins 346 fixed in the forward portion of the casting and the cam rolls 344 are mounted for free rotation on pins 348 projecting downwardly from a short horizontally disposed bar 350. The bar extends transversely of the wiper carrier head and is mounted on the forward end of a rod 352 the latter being slidaly mounted in the forward portion of the wiper carrier head 272 and yieldably held in a forward position by a spring 354. The rod 352 normally occupies its forward position; however, if for some reason during the closing movement of the wipers severe resistance is met which tends to prevent closing of the wipers the rear ends of the carrier plates 336 will yield rearwardly against the thrust of the spring 354 to relieve the pressure at the toe end without appreciably affecting the pressure of the wipers along the sides of the toe.

The wipers 24 (Figs. 10 and 11) are relatively thin narrow plates 356 the inner opposed edges of which are curved to correspond substantially to the curvature of the average contour of the toe portion of a shoe. These wiper plates are preferably removable, fastened in recesses 358 formed in the inner edges of the wiper carrier plates 336 by means of bolts 360 so that any given set of plates may readily be exchanged for another set which corresponds more closely in size and/or style to the shoes to be operated upon.

The mechanism for imparting closing movement to the wiper plates 356 includes a pair of horizontally disposed rods 362 (Figs. 8 and 10) the forward ends of which are pivotally secured to the carrier plates 336 by means of pins 364 and the rear ends of which are yieldably connected to the power operated means. As illustrated the yieldable connection between the rear ends of the rods 362 and the power operative means is accomplished as follows. Extending rearwardly and downwardly from the bracket 318 (Figs. 8, 9 and 12) is a pair of arms 366 between which there is mounted a horizontal shaft 368 upon which there is pivotally mounted a pair of arms 370. The upper ends of the arms 370 are pivoted at 371 to the opposite sides of a substantially vertically disposed casting 372 the purpose of which will appear hereinafter. The rear ends of the rods 362 project rearwardly to points substantially opposite the midportions of the arms 370 and are connected thereto by sleeves 374 through which they pass, the sleeves being pivotally mounted between pins 376 journaled in opposed ears 378 projecting horizontally from trunnion pins 380 mounted on the arms 370. A collar 382 is fixed to each rod 362 forwardly of the sleeve 374 and between the collar and sleeve there is disposed on the rod a spring 384 which urges it in a forward direction and hence urges the wiper plates toward each other. Forward movement of the rods 362 is limited by locknuts 386 threaded on the rear ends of the rods 362 so as to abut the rear ends of the sleeve 374. The casting 372 to which the upper ends of the arms 370 are pivotally secured at 371 has a bore formed therein for the reception of a composite spindle 388 the lower end of which has a rounded end portion 390 arranged to rest in a recess 392 formed in the upper end of a short rod 394 which is yieldably supported in a cup shaped member 398 formed on an arm 400 by a spring 402 which is disposed in the cup between the bottom thereof and the under side of the upper end of the rod 394. Locknuts 404 retain the rod 394 in the cup against the action of the spring 402 by abutting the outer end face of the cup. The rounded end portion 390 of the composite spindle 388 permits free movement of the arms 370 which upon adjustment heightwise by means of the composite spindle 388 rock on the shaft 368 to accomplish adjustment of the spacing of the wipers as will appear hereinafter and also permits the casting 372 to rock forward with the arms 370 when the wiper carrier head 272 is moved forwardly under power during the toe end tucking. A pin 406 is fixed in the rounded end 390 of the spindle and projects laterally therefrom at opposite sides into slots 408 (Fig. 1) formed in the walls of both the recess 392 and the walls of the cup 398 for reasons which will appear hereinafter. The arm 400 is pivotally supported on the shaft 368 between the arms 370 and has a forwardly projecting portion 410 (Fig. 12) which is connected through linkage to the cam 288 on the main drive shaft for closing the wipers. This linkage is similar to that connecting the forwardly projecting arm 309 (Figs. 8 and 9) of the yoke shaped member 278 to a cam 412 also mounted on the main drive shaft for moving the wipers forwardly prior to closing movement thereof during the tucking and crease forming operation and hence both linkages will be described at this point. Referring first to Fig. 12 the forward end 410 of the arm 400 is shown as connected to the upper end of a link 414, the lower end of which is connected between the rear ends of a pair of levers 416, the latter being pivoted at their forward ends on a transversely extending pin 418. Also pivoted between the rear ends of the levers 416 is a link 420 (Fig. 14). The link 420 has fixed in its lower end a pin 422 on which are blocks 443 which are mounted in arcuate slots 424 formed in the spaced walls of one arm 426 of a cam lever 428, the block being retained in place by integrally formed flanges 434 (Fig. 15) which engage the inner sides of the walls. The cam lever 428 (Fig. 12) is pivoted to the frame of the machine at 430 and has another arm 432 on which is mounted a cam roll 433 arranged to occupy a cam groove 436 formed in one face of the cam 268. The linkage connecting the forward end 360 (Fig. 9) of the yoke shaped member 278 to the cam 412 is substantially similar to that just described comprising briefly the link 298, levers 438 pivoted at 440, link 442, cam lever 444, cam roll 446 and cam groove 448 formed in one face of the cam 412. Both cams 268 and 412 are mounted on the main shaft 88 of the machine as heretofore pointed out which extends transversely thereof between the side walls of the base 10 as seen in Fig. 36 and by rotation of which the cams are driven to impart power operation to the parts of the machine above described. Both sets of linkage are provided with adjustable means to permit adjustment of the forward movement and closing movement of the wipers. Adjustment of the links 420 and 442 is accomplished similarly for both and hence only that for the closing movement of the wipers as illustrated in Fig. 12 will be described herein. Referring to Figs. 12, 14 and 15, the pin 422 is extended laterally from one of the blocks 443 to form a spindle 450 on which is mounted for free rotation a sleeve 456 having a knurled head 458 on one end and a gear 460 on the other end which meshes with a rack 462 fastened to the arm 426 adjacent to the slot 424. By rotation of the sleeve 456 the blocks 443 may be caused to move along the grooves 424 and hence to change the position of the lower end of the link 420 and the effective length of the arm 426. A locknut 464 threaded on the end of the spindle 450 provides means for locking the sleeve 456 from rotation and hence for locking the lower end of the link 420 at a given position in the slot. The provision of aforesaid adjustments for the linkage joining the power operated means to the arm 300 and 400 affords means for varying the amount of movement imparted thereto.

The mechanism for drawing the wiper carrier head 272 and hence the wipers downwardly to wipe the upper about the toe of the shoe after the wiper carrier head has been moved to its forward position above the shoe support, is illustrated in Figs. 4 and 5 wherein the links 306 which are attached to the forward portion of the plates 302 are shown connected at their lower ends to plates 466, the latter being pivotally mounted on horizontally disposed pins 468 fixed in the side walls of the head casting. To each plate 466 there is connected at its lower end a rod 470, the upper end of which is pivotally connected to the forward end of a cam plate 472. The rear end of each cam plate is pivoted on a horizontally disposed pin 474 fixed to the wall of the head casting. Each cam plate 472 carries a cam roll 476 arranged to occupy a cam groove 478 formed in one face of the cam 412 which is mounted on the main shaft 88 of the machine. It will be evident in Fig. 4 that counterclockwise movement of the cam plate 472 on its pin 474 produced by rotation of the cam 412 will draw the plate 466 downwardly in a clockwise direction about its pivot 468 and hence it will move the link 306 in a downward direction, thus rotating the plate 302 in a counterclockwise direction about its pivot 304 to move the wiper carrier head downwardly and hence to bring about down wiping of the upper over the toe of the shoe. It will be observed that the proportions of the aforesaid elements are such that when the wiper carrier head is in its foremost position (Fig. 5) and pressure is applied to the wipers to cause them to tuck the upper into the crease between the bottom of the last and the flange of the sole, the axes of the links 306 will be in line with the pins 468 which form the center of rotation of the plates 466 so that any reactionary force transmitted through the links 306 to the plates 466 will be taken up by the pins 468 and will not be transmitted to the cam plates 472.

After the wipers have been returned from their crease forming position above and out of contact with the toe of the shoe they are withdrawn rearwardly to their inoperative position automatically by means, the actuation of which is initiated by the movement of the grippers to their initial position. This is accomplished (Fig. 24) by means of an arm 830 one end of which is mounted for free rotation on the shaft 78 and the other end of which is connected by a spring 832 to one end of the lever 76 in such a manner as yieldably to hold an abutment 834 formed on the arm 830 against a shoulder 836 formed on the arm 76. Fixed to the lower end of the arm 830 is a roll 838 which is adapted to engage an arm 840 as the grippers rise. This arm 840 is integral with the arm 297 which is connected to the rod 296 for controlling the toggle levers 288 and 290 (Fig. 1) so that engagement of the arm 840 by the roll 838 will break the toggle levers 288 and 290 whereupon springs 842 (Fig. 1) will return the wiper carrier head to its inoperative position.

Each of the wiper blades is heated by means of a heating element 337 attached to the wiper head to maintain the wipers at a temperature of about 300° F.

Wiper adjusting means

An important feature of the present invention is the provision of means associated with the aforesaid toe embracing wipers 24 to adjust the spacing between the wiper plates 356 while the wiper carrier head is in its retracted or remote position as distinguished from the prior machine in which the adjustment of the spacing of the wipers was necessarily carried out by advancing the wipers to a position above the shoe support and setting their spacing by actual contact with the opposite sides of the last which necessitated operating the machine through a portion of its cycle to bring the wipers into position above the shoe support and thereafter continuing the operation of the machine through the remainder of its cycle of operation to return the wipers back to their initial inoperative position in readiness for commencement of a useful cycle of operation. The adjusting means employed herein also includes a visual means by which the operator may determine the necessary adjustment of the adjusting means for a given size shoe which is to be operated upon in advance of the operation of the machine, that is, without necessitating the operation of the machine in any respect. As shown herein the aforesaid means (Figs. 8 and 8a) comprise a knob 480 fixed to the upper end of the composite spindle 388 for rotating the same and for simultaneously changing the spacing of the wipers and adjusting the means for visually indicating the spacing of the wipers at any given time in shoe size. To this end the composite spindle 388 is composed of two parts 482 and 484 arranged in axial alinement. The lower end of the part 482 is recessed and threaded to receive the threaded upper end of the part 484, the latter having the hemispherical end 390 thereon. By reason of the threaded connection between the two parts and the fact that the part 484 is restrained from rotation relative to the part 482 by engagement of the pin 406 with the slots 408 (Fig. 1) rotation of the latter will move the two parts axially either toward each other to shorten the effective length of the composite spindle 388 or away from each other to lengthen it. Such axial movement of the part 482 is transmitted to the casting by a shoulder 486 thereon which abuts the lower end of the casting 372, causing the casting to rise and hence to raise the upper ends of the arms 370 causing them to move in a counterclockwise direction about their lower ends on the shaft 368. Movement of the arms 370 about the shaft 368 will change the longitudinal position of the rods 362 and hence change the spacing of the wipers as heretofore indicated. It is evident that by this construction the distance between the wipers may be adjusted to any given spacing by rotation of the spindle while the wiper carrier head is withdrawn. To indicate what the spacing of the wipers will be in shoe size for a given rotation of the spindle and consequent displacement of the rods 362 there is fastened to the composite spindle 388 in the upper portion of the casting 372 a gear 488 which meshes with a gear 490 mounted on a stud 492 fixed in a vertical position in a shallow recess 494 formed in a laterally extending housing integral with the upper portion of the casting 372. The gear 490 has on its upper side a hub 496 to the upper end of which is fixed a disk 498 and on the face of the disk 498 there is embossed an arrow 500 (Fig. 8a). Surrounding the disk 498 is a relatively fixed annular member 502 having a graduated set of scales of shoe sizes 504 impressed thereon for cooperation with the arrow 500. The ratio of the gearing is such that the disk 498 and hence the arrow 500 will be rotated through an angle which is proportionate to the turning movement imparted to the composite spindle 388.

The graduations of the scale on the annular member 502 represent different sizes and styles of shoes, for example, men's, women's and children's, which may be encountered, and are so spaced that by turning the composite spindle 388 to cause the arrow 500 to move along the scale, for example two graduations, the wipers will automatically be adjusted to suit a shoe differing in size from the prior shoe by two sizes.

As previously indicated it is preferable to employ wiper blades which correspond closely to the size and style of a shoe being operated upon to obtain best results although a given set of wiper blades will normally operate efficiently on shoes of the same style two sizes smaller or two sizes larger. Accordingly the relatively fixed annular member 502 is seated on an annular shoulder 506 so that its position relative to the arrow 500 may be varied to suit the size wiper blades mounted in the machine in any given time. To this end a spring-pressed plunger 508 is provided which extends through the forward side of the casting and engages in one of the series of holes 510 formed in the periphery of the annular member. If now with a pair of wiper blades for size 8 shoes mounted in the machine and with the annular member 502 set so that the graduation 8 on the scale of men's shoes is opposite the zero reference mark, the arrow 500 is rotated by the spindle to cause it to point directly at the zero reference mark, the wipers will be spaced the correct amount to perform the proper wiping action upon a size 8 men's shoe. By rotating the arrow 500 to swing it in one direction or the other with respect to the zero reference mark two graduations on either side of the graduation 8, the wipers will be spaced correctly for a size 6 or a size 10 men's shoe of the same style. If wipers cut to match women's size 4 are substituted in the machine for the wipers heretofore referred to, the annular member 502 must be relocated relative to the zero reference mark to bring the graduations 4 of the scale of women's shoes opposite it, whereupon when the arrow 500 is caused to point toward the zero reference mark by rotation of the spindle the wipers will be spaced correctly for a size 4 women's shoe.

Proper wiping action for shoes of a given size heretofore provided for by positioning the arrow 500 opposite the reference mark zero will, of course, only hold true if the upper material is all of uniform thickness. Since there is considerable variation in the thickness of leathers for different styles of shoes there is provided a further adjustment to insure the attainment of good wiping action under all conditions. As illustrated, there are marked on the casting at opposite sides of the zero reference mark, other reference marks representing thicknesses of leather which are greater or less than that represented by the zero reference mark. Hence by displacing the annular member 502 from the zero mark in one direction or the other in accordance with the instant thickness of the leather and rotating the arrow 500 to bring it opposite the new reference mark instead of the zero reference mark, the wipers will be spaced not only correctly for the size shoe being operated upon but also to compensate for the thickness of the leather for that size shoe.

Vamp pressing member

To assist in holding the shoe on the shoe support and in shaping the shoe upper to the last there is provided a vamp pressing member 512 (Figs. 1 and 8) which is arranged to descend with the wipers to press the upper firmly against the top of the last in the region of the toe cap line. As illustrated the vamp pressing member is mounted on a pair of horizontally disposed pins 514 (Figs. 1, 2 and 8) which are secured in the upwardly extending arms 282 of the yoke member 284. This member consists of a pair of spaced forwardly extending arms 516 pivotally mounted on the aforesaid pins 514 which converge above the wiper carrier head 272 to form a single forwardly extending neck 518 which lies directly above the wiper carrier head. Secured to one side of the neck 518 is a trunnion block 520 (Fig. 8) through which passes a trunnion rod 522 the lower end of which is pivotally connected by a pin 524 to the wiper carrier head. The trunnion rod 522 has a shoulder 526 thereon which bears against the under side of the trunnion block 520 thereby supporting the neck 518 at a given position with respect to the wiper carrier head. A portion of the trunnion rod 522 extends above the trunnion block and has thereon a stiff spring 528 which is disposed between the top of the trunnion block and a thumb nut 530. By reason of the aforesaid construction the neck 518 may yield upwardly under pressure exerted at the forward end thereof and the point at which yield will occur will be determined by varying the compression in the spring 528. The forward end of the neck 518 has an axial bore 532 formed therein in which there is slidably positioned a stem 534, the position of which may be adjusted to and maintained at a given point by a thumb screw 536 threaded through the wall of the neck into the bore 532. The stem 534 has an enlarged head 538 thereon which has a vertical threaded bore 540 formed therein for the reception of a threaded sleeve 542. Within the sleeve 542 there is disposed a rod 544 having at its lower end an enlarged head 546 bifurcated at its lower end to pivotally receive a rubber padded block 547 which constitutes a vamp pressing pad. The rod 544 is free to rotate within the sleeve 542 but is held from longitudinal movement with respect thereto by a shoulder 548 formed on the head 546 which abuts the lower end face of the sleeve 542 and a collar 550 pinned to its upper end which abuts the upper end face of the sleeve 542. A knurled head 552 formed at the upper end of the threaded sleeve 542 provides for rotating the sleeve and hence adjusting the pad heightwise of the shoe without rotating the pad relative to the toe of the shoe.

Shoe positioning means

Another novel aspect of the present invention is in the provision of shoe positioning means consisting of a pair of fingers 554 (Figs. 8, 16 and 23) which are so positioned that they engage the wood of the last below the upper material, in contrast to the previous machine in which the positioning means engaged the upper, so as not to damage it during the centering of the shoe with respect to the wipers, and are so constructed and operated that they cooperate with the wipers during a part of the down wiping movement of the wipers to supplement the tensioning of the grippers thereby more uniformly to distribute the tension in the upper during the wiping action and to provide supplemental tensioning of the upper after the toe-end gripper has released the upper and while the side grippers have partially released the upper as heretofore explained. As illustrated in Figs. 4, 5 and 8 the fingers 554 are mounted in a plane which is substantially on a level with the plane of the central portion 14 of the shoe support (Figs. 16 and 23) for movement toward each other over the surface of the support; laterally of the machine as a unit; heightwise of the shoe on the support (Figs. 4 and 5) and outwardly and downwardly away from the shoe support. To accomplish this the fingers 554 are mounted on a member 555 consisting of a pair of spaced arms 556 (Fig. 23) from the forward ends of which there project inwardly flanges 558, the flanges meeting inwardly of the arms to form a web 560 which joins the arms together. The rear ends of the arms and hence the member 555 are supported for pivotal movement on pins 562 (Fig. 8) and the forward end of the member is supported so that it will normally be substantially in the plane of the support by means which will be described hereinafter. The inwardly projecting flanges 558 (Fig. 23) have in their upper surfaces arcuate grooves 564 for the reception of the fingers 554 which are arcuate in shape so that movement of the fingers in the grooves causes their ends to move to and from each other. The end portions 566 of the fingers are bent upwardly at an angle of about 15° (Fig. 8) so that they clear the upper surface of the shoe support and project inwardly and over the same to engage the wood of the last above the sole but below the upper material (Fig. 33). The fingers 554 (Fig. 23) near their rear ends are bifurcated to form spaced ears 568 between which are pivotally secured by pins 570 rearwardly extending links 572. The rear ends of the links 572 are pivotally connected to horizontally disposed plates 574, the latter in turn being pivotally connected for rotational movement in a substantially horizontal plane about vertical axes to a slide 576 by means of pins 578. The slide 576 is mounted in guideways 580 (Fig. 8) formed in the arms 556 for forward and rearward movement, such movement imparting closing or opening movement to the fingers 554 by reason of the aforesaid curvature of the grooves 564. Each of the plates 574 is bifurcated at its rear edge to provide pairs of ears 582 adapted to embrace short sleeves 584 which are internally threaded to receive the threaded portions 586 of a spindle 588 (Fig. 23). The threaded portions of the spindle 588 are right and left hand respectively and hence rotation thereof by means of a knurled head 590 will rotate the plates 574 about their pivot pins 578 to move the fingers 554 to or from each other, thereby providing for an initial adjustment of these fingers to space them in accordance with the breadth of the last at the toe end. To accomplish centering of the last as a whole with respect to the wipers the fingers 554 may be moved bodily transversely of the shoe support by rotation of a sleeve 592 threaded into a bore 594 formed in the slide 576 through which the spindle 588 freely passes and which is held from longitudinal movement therein by shoulders 596 and 598 on the spindle 588 which engage the opposite ends of the sleeve. A knurled head 600 formed on the outer end of the sleeve provides for rotation to cause axial movement thereof. Such axial movement of the sleeve and the spindle will cause the plates 574 to swing in unison to one side of the machine or the other and will, if the fingers 554 are then engaging the opposite sides of the toe of the last resting on the support, move the toe bodily across the support, thus adjusting its lateral position relative to the wipers. It is desirable that the fingers 554, after having been positioned to center the last with respect to the wipers, retain the last and shoe assembled thereon in its correct relative position to the wipers until the down wiping action is nearly complete, that is, up to that stage in the wiping action where the wipers begin their crease forming action, and that they then be moved to an out-of-the-way position by outward and downward movement and during this withdrawing movement that they serve the added function in cooperation with the downwardly moving wipers of gripping the upper between them and the wipers to supplement the tension of the grippers, especially at the toe end of the upper which as previously pointed out is at about this time released by the toe-end gripper. The outward and downward movement of the fingers 554 takes place in two stages. First the fingers are moved outwardly and downwardly by cam means and then while the fingers continue to move outwardly they are moved further downwardly by the down wiping movement of the wipers against a spring beneath their supporting member 555 so that the fingers press the upper against the under side of the wipers and simultaneously tension the upper outwardly. To accomplish this the slide 576 (Fig. 8) has a post 602 projecting upwardly and centrally of its forward end (Fig. 23), the upper end portion of which is bifurcated at 604 to receive a cam roll 606 mounted on a pin 608 fixed in the bifurcation. A transversely extending bar 610 is bolted at its opposite ends to the arms 556 (Fig. 23) and depending from its under side is a hook shaped member 612 (Fig. 8) which has therein a sloping cam slot 614 adapted to receive the cam roll 606. When the machine is at rest and the fingers 554 are in their closed together position above the shoe support and out of contact therewith, the slide 576 is in its most forward position and in this position the cam roll 606 occupies the forward uppermost portion of the cam slot 614 as shown in Fig. 4. Hence the member 555 is positively held in a substantially horizontal position so that the fingers 554 lie above the shoe support in readiness to receive between them the toe end of the last upon which the shoe is assembled to be operated upon and to center it with respect to the wipers. As the wipers move downwardly, however, under the control of the plates 302, rearwardly extending arms 616 (Figs. 1, 4 and 5) bolted to the under sides of the plates 302 serve to draw the slide 576 rearwardly and simultaneously to move the member 555 downwardly and hence to move the fingers outwardly and downwardly as will now appear. To this end the rear ends of the arms 616 are pivotally connected to the upper ends of rods 618, the lower ends of which are pivotally attached to short arms 620 mounted on fixed pins 622. There are also connected to the arms 620 rods 624, the upper ends of which are connected to knuckles 626 joining two toggle links 628. The rear one of the toggle links 628 is joined by a pin 630 to the rear end of the member 555 while the forward one of the links 628 is connected to the slide 576. Downward movement of the plates 302 about their pivot 304 will move the arms 616 in a counterclockwise direction which lifts the rods 618 and hence the rods 624 so as to break the toggle links 628 upwardly (Fig. 5) and draw the slide 576 rearwardly. Rearward movement of the slide 576 is accompanied by rearward movement of the cam roll 606 carried thereby and since the cam hook 612 is fixed, the slope of the cam slot 614 causes the member 555 to be moved downwardly as the cam approaches the open end of the cam slot. The slope of the cam slot is such that downward movement of the member 555 is slower than the downward movement of the wiper so that as the wipers approach the last part of their downward movement and the cam roll 606 moves out of the cam slot the wipers force the upper into engagement with the fingers and as they complete their final movement they force the fingers downwardly as they continue to move outwardly against a stiff spring 632 (Fig. 8) which engages the under side of the member 555. This, it is evident, results in a gripping and tensioning of the upper apart from that afforded by the grippers. As the wipers are returned to their original position the spring 632 lifts the member 555 so that the cam roll 606 is at the level of the open end of the slot 614 whereupon the upward movement of the plates 302 draws the knuckles 626 of the toggle links 628 downwardly to straighten them (Fig. 4) and hence moves the slide 576 forward, thus pushing the cam roll 606 upwardly in the cam slot 614 to the forward end thereof thereby to return the member 555 to its initial position and positively hold it in position.

*Shoe supporting means*

The means for supporting the shoe in position to be operated upon as heretofore described which comprises a central portion 14 (Fig. 16) upon which the forepart of the shoe rests and a supplemental surrounding portion 16 associated therewith which is brought into engagement with the marginal portion of the sole of the shoe after the margin of the upper has been wiped into the crease between the bottom of the last and the margin of the sole to force the marginal portion of the sole upwardly to pinch the tucked in upper between it and the last, will now be described. Referring particularly to Figs. 8, 16 and 18 the central portion of the support is illustrated as consisting of a substantially horizontally disposed bar 636 having fixed in its upper surface three rubber pads 638. Two of these pads occupy positions midway of the length of the bar at about the ball line of the shoe to be supported thereon and the third occupies a position for supporting the toe portion of the shoe. The bar 636 has a short downwardly projecting part 640 at its forward end by which it is pivotally supported (Fig. 8) on a pin 642 fixed in the upper end of a rod 644 which is slidably disposed in a bore 646 formed in the casting 164 which as heretofore referred to projects forwardly from the frame of the machine. The surrounding shoe supporting means 16 which as heretofore indicated serves to force the marginal portion of the sole upwardly during the tucking in of the upper material comprises a flat plate 650 which surrounds the bar 636 and is shaped to conform substantially to the forepart of the sole. The plate 650 is detachably secured to the upper end of a reciprocable shaft 652 which lies parallel to the rod 644 (Fig. 8) in a bore formed in the casting 164. The shaft 652 has an enlarged head 654 thereon which is somewhat smaller than the plate 650 and the latter is connected thereto by tongue and groove connections 656 (Figs. 17 to 22 inclusive). A spring-pressed plunger 658 (Fig. 17), recessed into the upper face of the head 654 in such a manner that its upper portion occupies a correspondingly positioned recess in the under side of the plate 650, retains the plate in a locked position on the head. A pin 660 projecting from the plunger through the wall of the head 654 so as to be accessible provides means for retracting the plunger so that the plate 650 may readily be removed from the head 654 by sliding movement. To permit removal of the plate 650 the bar 636 must be swung upwardly about its pivot 642. In its horizontal shoe receiving position, however, the bar 636 is guided by engagement of a vertical face 662 (Fig. 8) formed on the downwardly extending portion of the post 640 with a corresponding vertical surface 664 at the forward side of the shaft 652.

The surrounding portion 650 is initially held below the bar 636 in an out of the way position and is moved upwardly at the proper time in the cycle of operation of the machine as follows. The lower end of the shaft 652 (Fig. 18) is connected to one end of a toggle link 666, the opposite end of which is pivotally attached to one corner of a triangular plate 668. The plate is in turn pivotally attached at a corner to the upper end of a cylindrical head 670 slidably mounted in a bore 672 formed in the lower portion of the casting 164 for a purpose which will appear hereinafter. The third corner of the plate 668 is connected to one end of a link 673 which joins this corner of the plate to one corner of a corresponding triangular plate 674. The plate 674 is pivotally mounted at a second of its corners on a pin 676 set into the casting and is pivotally attached at its third corner to a connecting rod 678 having formed in its free end a forked portion 680 adapted to engage the opposite sides of a block 682 mounted for free rotation upon the main shaft 88 of the machine. There is secured to the connecting rod 678 a cam roll 684 which is arranged to occupy a cam groove 686 formed in one face of the cam 412 which as heretofore pointed out is mounted on the main shaft 88. Rotation of the cam 412 in a direction to bring the toggle link 666 into alinement with the longitudinal axis of the shaft 652 will raise the shaft 652 which in turn will raise the surrounding portion 650 with respect to the bar 636 and hence press the marginal portion of the bottom upwardly relative to the center portion of the bottom to pinch the upper between the bottom of the last and the marginal portion of the sole. The head 670 has formed at the lower side a downwardly extending stem 688 which is surrounded by a heavy compression spring 690 disposed between the head 670 and an adjustable sleeve 700 slidably mounted in the lower end of the casting. By the aforesaid construction it is evident that the compression spring 690 yieldably holds the head 670 at a given position so that as the toggle link is straightened to raise the surrounding portion against the marginal portion of the sole by a heightwise movement of the surrounding portion the pressure will be applied yieldably.

In order to secure the correct initial heightwise position of the surrounding portion 650 the sleeve 700 has at its lower end a threaded bore 702 for the reception of a threaded stem 704 projecting upwardly from a bevel gear 706 which is rotatable about the axis of its stem. Meshing with the gear 706 is a gear 708 which may be rotated by means of a knob 710 secured to the outer end of a stem 712 to the inner end of which the gear 708 is fixed. The gear 706 is supported at the lower end of the casting 164 by a plate 714 which closes the same. Rotation of the knob will therefore adjust the initial heightwise position of the sleeve 700 and hence the surrounding portion 650.

In order that the inner portion of the support, that is, the bar 636 may also be moved upwardly with the surrounding portion 650 during the heightwise adjustment of the latter for correct heightwise position the lower end of the rod 644 has fixed therein a pin 716 which projects laterally therefrom through a slot 718 formed in the casting 164 and which is adapted to rest on the upper end of a rod 720 which extends downwardly along the casting and is secured at its lower end to the sleeve 700.

In some cases unusually thick soled shoes are encountered which offer difficulty in properly positioning them on the central portion of the shoe supported in a position to be grasped by the gripper jaws and hence it is desirable to provide means for initially retracting the bar 636 by a small amount from its normally adjusted position heightwise of the grippers to a lower position and then after the shoe has been placed thereon to return it to its normal position. To this end the rod 644 for supporting the bar 636 may be connected to the rod 720 so that heightwise movement of the latter will be communicated to the bar 636. To this end the lower end of the rod 720 is connected to means for automatically imparting the desired heightwise movement thereto as will be seen by reference to Figs. 34 and 35. As illustrated therein the lower end of the rod 720 has mounted thereon a cam roll 722 which is adapted to rest on the surface of a cam 724, the latter being fixed to a horizontally disposed shaft 726 extending transversely of the casting. At the opposite end of the shaft there is fixed a short arm 728 which projects downwardly therefrom and is in turn connected by a short link 730 to one arm 732 of a bell crank lever 734 pivotally mounted on a pin 736 at the lower end of the casting. The other arm 738 of the bell crank lever 734 extends substantially horizontally and has fixed to it a hardened block 740 which is adapted to engage the upper end 742 of a latch member 744 pivotally attached at 746 to the upper end of the sliding stem 108 heretofore mentioned by which the toe-end gripper is caused to produce initial tension in the toe end of the upper and which is actuated through the latch 138 by the knee operated pad 113. The latch member 744 is yieldably held by a spring 748 against the forward end of a finger 750 projecting forwardly from the latch releasing member 124 which forms a part of the aforementioned means for bringing about the initial gripping and tensioning of the toe-end gripper. The shoulder 134 on the latch releasing member 124 lies rearwardly of the forward end of the finger 750 and is adapted to engage and release the latch member 138 subsequently to the release of the latch member 744 so that the movement of the shoe support to its normal heightwise position is accomplished prior to the movement of the toe-end gripper into gripping relation with the upper material. The raising of the shoe support 636 is accomplished when the latch member 744 is displaced from beneath the block 740 by a spring 754 connected to the arm 732 and to the casting which draws arm 728 toward the right as shown in Fig. 34, thereby causing counterclockwise rotation of the shaft 726 and hence of the cam 724 so that the cam is rotated beneath the cam roll 722 to bring the curved portion of the surface thereof beneath it. The shoe support will later descend by gravity in readiness for positioning the succeeding shoe thereon for the next cycle of operation when the latch 744 is moved downwardly relative to the block 740 which permits the spring 748 to draw the latch rearwardly so that upon its next upward movement it will again engage the under side of the block 740.

*Heel supporting means*

Figure 1:
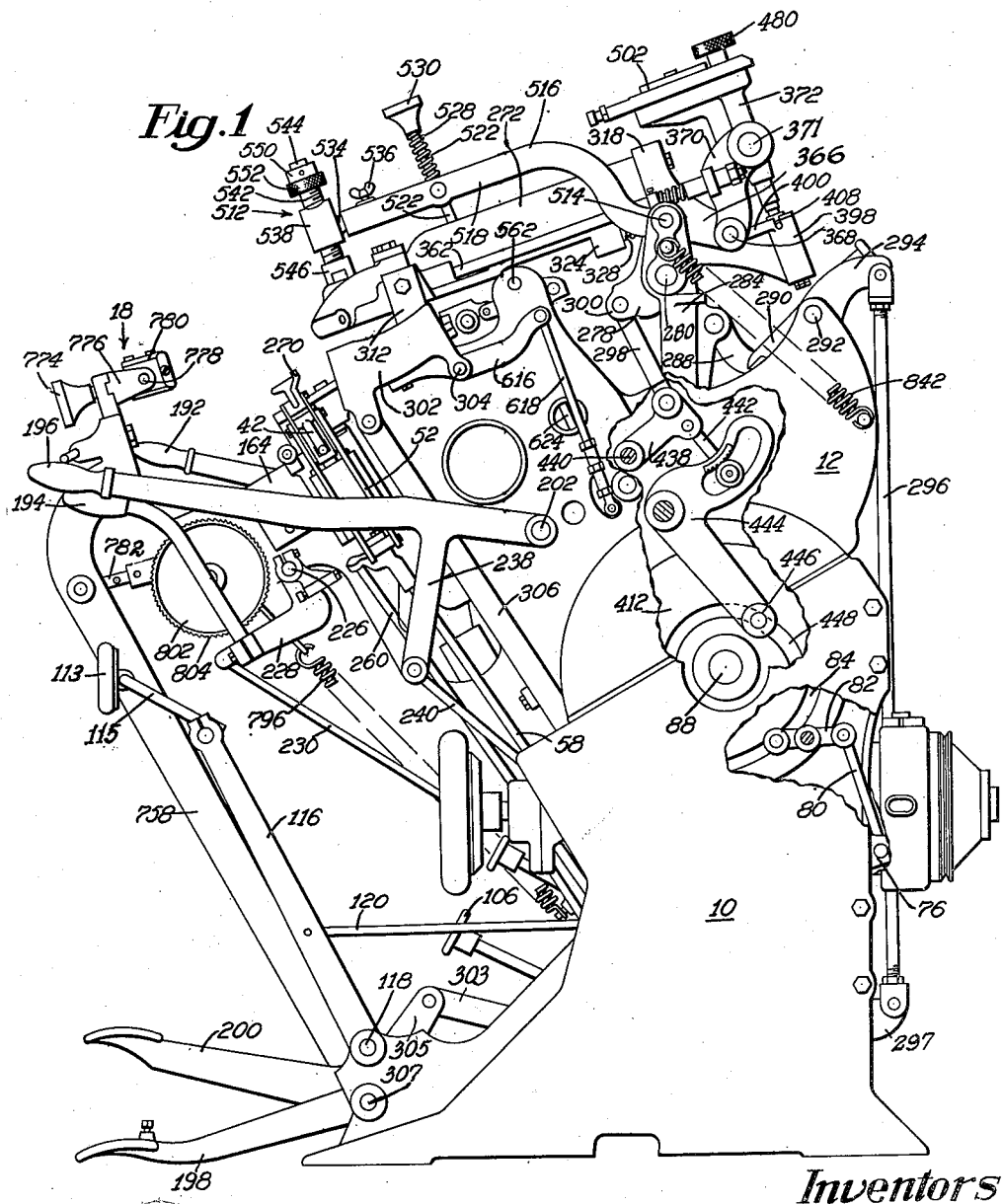
Fig. 1 is an elevation of the right-hand side of the machine.

In addition to the supporting means just described upon which the forepart of the shoe rests there is provided supporting means 18 for the heel portion of the shoe which is illustrated in Figs. 1, 8 and 33. This heel supporting means 18 comprises an inclined arm 758 which is pivotally mounted at its lower end (Fig. 1) on the shaft 307 at the base of the machine and has at its upper end on an inwardly directed portion thereof a way 761 in which there is mounted a slide block 762 which may be adjustably held in any given position in the way by a bolt 764 which passes through the arm and a slot in the slide and has a nut 766, on one end which may be brought up against the slide block by rotation of the bolt, a handle 768 being provided for this purpose. The upper end of the slide block 762 has a T-shaped head in which there is formed a horizontal groove for the reception of a tongue on the forward side of a block 770 which is held therein by a bolt 772 extending through the head and being threaded into the block. A head 774 provides means for rotating the bolt. The block 770 has rearwardly extending spaced ears 776 (Fig. 8) between which there is pivoted on trunnions 778 a substantially U-shaped member 780 which corresponds in contour to the rear part of a shoe and is adapted to embrace the same. In order to hold this U-shaped member 780 in engagement with the rear part of the shoe there is connected to the arm 758 one end of a link 782 (Fig. 33) having a series of holes 784 therein which provide for its adjustable attachment by means of a pin 786 to a sleeve 788 in which it is arranged to slide. The sleeve 788 has a rack 790 on its under side which meshes with a gear 792 mounted on a shaft 794 and the gear is urged to rotate in a clockwise direction thereby to draw the sleeve 788 and hence the arm 758 to the right as seen in this figure by a spring 796 connected at its upper end to one end of a chain 798 which passes over the gear 792 and is fastened thereto at its opposite end by a pin 800. To lock the heel support in position against the heel end of the shoe there is mounted on the shaft 794 of the gear 792 a ratchet wheel 802 with the toothed edge 804 of which there cooperates a spring-pressed latch 806, the latter being mounted in the lower end of an arm 808 mounted on a shaft 810 in such a position that rotational movement of the gear in a counterclockwise direction is prevented by engagement of the latch 806 with the teeth of the ratchet 802. In order to release the heel end of the shoe and to hold the heel end support in an out of the way position during such times as when the shoe is being mounted on the toe support and removed therefrom an arm 812 is fixed to the shaft 810 and has a roll 814 pivoted in the end portion thereof in a position to engage the rear end 816 of the sleeve 788. To the lower end of the arm 812 which extends below the shaft 810 is attached a rod 818 which is connected at its opposite end to a cam lever (Fig. 36) arranged to be actuated by a cam groove 822 formed in one face of the cam 268 which is fixed in the main shaft 88 of the machine. Movement of the arm 812 forwardly will bring the roll 814 into engagement with the sleeve 788 and push it forwardly against the tension of the spring 796 so as to move the arm 758 forwardly to withdraw the heel supporting member 770 from the rear end of the shoe.

Prior to operating the machine the following adjustments are normally made. First the wipers are adjusted to space them correctly for the size and style of shoe which is to be operated upon. To this end, wiper plates 356 corresponding to the size and style shoe to be operated upon are bolted to the wiper carrier plates 336. The annular member 502 of the indicator is then rotated relatively to the arrow 500 to bring the graduation on the annular member corresponding to the size and style of the selected wipers opposite the zero reference mark on the casting and then the knob 480 is rotated to bring the arrow 500 opposite the selected graduation whereupon the wipers will be correctly spaced to perform satisfactory wiping action. If it should appear that the upper leather for this particular run of shoes is unusually heavy or light, the wipers may be further adjusted to compensate for this by rotating the annular member 502 relative to the zero reference mark so as to bring the selected graduations opposite the one of the reference marks at one side or the other of zero reference mark which corresponds to the thickness of the leather and when the arrow is now rotated from the zero reference mark to the new reference mark the wipers will be properly spaced not only for the size shoe to be operated upon but to compensate for any departure in the thickness of the leather from an average thickness.

After the wipers have been adjusted, the last with the upper assembled thereon is placed upright with the toe portion of the sole resting on the central portion 14 of the support against the shoe positioning fingers 554. The knob 590 (Fig. 23) is then rotated to bring the fingers into engagement with the opposite sides of the toe portion of the last beneath the upper material and the knob 600 is rotated to move the fingers bodily transversely of the support to center the last relative to the wipers.

Having adjusted both the wipers and the shoe positioning fingers the grippers 22 are adjusted widthwise and longitudinally of the support to cause them to grip the marginal portions of the upper at such points as will afford the best shaping of the upper to the last by rotation of the nut 190 (Fig. 26) which adjusts the position of the cam roll 168 and manipulation of the handle 176 to set the detent 174 into the proper serration. Finally the heightwise and lateral position of the heel end support 18 is adjusted to properly engage the heel end of the shoe by manipulation of the nuts 768 and 774 respectively (Fig. 33).

Having made the aforesaid adjustments the machine is in readiness to begin operating on a run of shoes. The operator slides the end of the sole under the grippers 22 and 24 to bring the last into engagement with the shoe positioning fingers 554 and then places the margin of the upper between the jaws of the toe-end and side grippers. Having thus positioned the shoe the operator pushes the knee pad 113 rearwardly. Initial rearward movement of the knee pad serves first to raise the central portion 14 of the shoe support by release of the latch 744 (Fig. 35) and then to cause the jaws of the toe-end gripper 20 to grip the toe end portion of the upper and to draw it downwardly. Having brought the shoe to the correct heightwise position and imparted an initial tension to the marginal edge of the upper at the toe end thereof the operator then trips the clutch for setting the machine into power operation by depressing the treadle 198. This causes the main shaft 88 of the machine to rotate about one-fifth of a revolution and then come to rest. During this period the heel end support 18 begins to move rearwardly into engagement with the heel end of the shoe and the grippers 20 and 22 begin to move downwardly and outwardly under pressure, the toe-end gripper being already engaged with the upper and holding it under a light tension when the power is applied. At about the time the grippers conclude their downward and outward movement the heel end support reaches its final position and becomes locked in place by reason of the engagement of the latch 836 with a tooth 804 on the ratchet wheel 802. The shoe positioning fingers 554 remain stationary during the aforesaid period and serve to support the upper material between the grippers as it is drawn downwardly over them so that there is a minimum of distortion and sag.

While the upper is thus held under yielding tension by the springs 90 and 110 the operator inspects the upper to see if it is properly located on the last and if at this time he is not satisfied with its condition, he may then increase or decrease its tension by manipulation of the hand levers 192 and 196 provided for this purpose; shift it from side to side by manipulation of the hand lever 194 or may, by depressing the treadle 198 beyond its original position, release the grippers and return them to their initial position for a regripping and retensioning of the upper if he is not satisfied with the location of the upper and tensioning thereof after making the aforesaid adjustments.

When the operator is fully satisfied with the manner in which the upper is tensioned over the last he depresses the wiper control treadle 200 thus moving the wiper carrier head 272 forward without disturbing the adjusted spacing of the wiper plates by reason of the fact that the wiper adjusting mechanism and visual indicator move bodily with the wiper carrier head. At the same time the vamp pressing member 512 moves forward into a position above the toe of the shoe. By continued depression of the treadle 200 the clutch is tripped to cause the main shaft of the machine to begin rotation again and to rotate through about three-fifths of a revolution whereupon the wiper carrier head and hence the wipers are moved downwardly by power to a position substantially on a level with the plane of the upper face of the sole of the shoe and then are moved inwardly. During the latter part of the down wiping movement of the wipers the shoe positioning fingers 554 are moved outwardly and downwardly ultimately to an out of the way position to allow the wipers to reach in their down wiping movement the level of the sole without interference. The downward movement of the fingers, however, is arranged by reason of the cam means to be somewhat slower than the downward movement of the wipers, hence during the final downward movement of the wipers they press the marginal portion of the upper against the fingers which are moving outwardly from the edge of the sole. As the wipers continue their downward movement they force the fingers downwardly against yieldable means supporting them while they still move outwardly and hence impart a tensioning and wiping action to the marginal edge of the upper at this time.

At about that point in the downward movement of the wipers when they lie opposite the upper edge of the beveled surface of the last and just before the wipers clamp the upper material against the shoe positioning fingers, the toe-end gripper is caused to entirely release its grip upon the toe portion of the upper to facilitate forcing the upper material into the crease between the bottom of the last and the outwardly projecting margin of the sole hence the tensioning imparted by the action of the positioning fingers in cooperation with the wipers is advantageous in that there is no complete release of control at this time.

Also at this time the downward movement of the wipers brings them into engagement with the fingers 270 of the side grippers 22 which are depressed thereby to effect a partial release of jaws of these grippers on the marginal edge of the upper so that the upper material along the sides of the toe slides between the jaws thereby permitting the grippers to be drawn downwardly by the springs 90 into positions which are below the lowermost position of the wipers. The grippers when caused to release the upper, are drawn downwardly at a much faster rate than the down wiping movement of the wipers, hence they move out of engagement with the wipers so that the spring-pressed plunger 250 functions to return the upper jaws to relation with the lower jaws thereby to regrip the upper material. As a result, when the wipers reach their lowermost position in readiness for their in-wiping action the upper is again held under tension between the wipers and the shoe positioning fingers and also by the side grippers which have taken a new grip on the upper material but at a point somewhat lower down on the marginal portion of the upper. While these conditions exist the wipers are advanced a short distance inwardly toward the toe of the shoe without closing to force the upper material into the crease at the toe end of the shoe and then are closed while still advancing a short distance to complete their crease forming action around both the end and the sides of the toe. At about this time the side grippers are automatically caused completely to release the upper. After the wipers have reached their crease forming position they remain in this position and the surrounding portion 16 of the shoe support is moved upwardly against the marginal portion of the sole to press the flange against the creased upper material lying between it and the last so as to hold it in place while adhesive which has previously been applied sets or other securing means is applied.

The machine is automatically brought to rest with the marginal portion of the sole under pressure. When sufficient time has been allowed for setting of the adhesive or other fastening means the clutch treadle 198 is depressed a third time and the main shaft is caused to complete its full rotation and restore all the parts to their original inoperative position.

Having thus described our invention, what we claim as new and desire to secure by Letters Patent of the United States is:

1. In a toe lasting machine, a shoe support for receiving the forepart of the sole of a shoe assembled on a last, grippers movable heightwise of the support for tensioning the upper over the toe, means for effecting downward movement of the grippers to tension the upper and yieldably to hold it under tension, wipers movable heightwise of the support for wiping the tensioned upper downwardly about the toe and inwardly widthwise of the support for tucking the marginal portion of the upper into the crease between the bottom of the last and the margin of the sole, means for effecting heightwise and widthwise movement of the wipers, and means for causing the grippers partially to release the marginal edge of the upper as the wipers approach in their down wiping movement the level of the sole followed by a regripping of the marginal edge of the upper at points lower down thereon as the wipers begin their crease forming movement.

2. In a toe lasting machine, a shoe support for receiving the forepart of the sole of a shoe assembled on a last, grippers movable heightwise of the support for tensioning the upper over the toe, means for effecting such heightwise movement and for holding the upper under tension, wipers movable heightwise of the support for wiping the tensioned upper downwardly about the toe and inwardly widthwise of the support for tucking the marginal portion of the upper into the crease between the bottom of the last and the margin of the sole, means for effecting heightwise and widthwise movement of the wipers, and means automatically operable by the down-wiping action of the wipers to cause the grippers to release the upper as the wipers approach the level of the sole and then to regrip the upper at points lower down thereon as the wipers begin to move widthwise in their crease forming action.

3. In a machine for working uppers over lasts, a support for receiving the forepart of the sole of a shoe assembled on a last, grippers movable heightwise of the support for tensioning the upper over the last, power operated means including yieldable means for causing the grippers to grip the marginal portion of the upper, draw the grippers downwardly and to hold them in their down drawn position, wipers movable heightwise of the last to shape the upper to the toe and then inwardly widthwise thereof to tuck the upper into the crease between the bottom of the last and the margin of the sole, means for effecting heightwise and widthwise movement of the wipers, means operable as the wipers approach the level of the sole to cause the grippers to release their grip on the marginal portion of the upper whereupon said grippers are drawn further downward by said yieldable means independently of the power operated means, and means operable upon movement of said grippers further downward to cause the grippers to regrip the margin of the upper at points lower down thereon as the wipers begin their widthwise crease forming movement.

4. In a machine for working uppers over lasts, a support for receiving the forepart of the sole of a shoe assembled on a last, grippers movable heightwise of the support for tensioning the upper over the last, power operated means including yieldable means for causing the grippers to grip the marginal portion of the upper, draw the grippers downwardly and hold them in their down drawn position, wipers movable heightwise of the support to shape the upper to the toe and then inwardly widthwise thereof to tuck the upper into the crease between the bottom of the last and the margin of the sole, and gripper release means operable by engagement therewith of the wipers in their down-wiping movement as they approach the level of the sole to release the grip of the grippers on the margin of the upper whereupon the grippers are drawn further downward by said yieldable means independently of the power operated means, said further downward movement withdrawing said gripper releasing means from engagement with said wipers whereupon said grippers regrip the marginal edge of the upper at points thereon at a lower level substantially simultaneously with the widthwise crease forming movement of the wipers.

5. In a machine for working uppers over lasts, a support for receiving the forepart of the sole of a shoe assembled on a last, grippers movable heightwise of the support for tensioning the upper over the last, power operated means including yieldable means for causing the grippers to grip the marginal portion of the upper, draw the grippers downwardly and hold them in their down-drawn position, wipers movable heightwise of the support to shape the upper to the toe and then inwardly widthwise thereof to tuck the upper into the crease between the bottom of the last and the margin of the sole, gripper release means arranged to lie in the path of the wipers in their down-wiping movement and to be displaced by engagement of the wipers therewith as they approach the level of the sole to release the grip of the grippers on the margin of the upper whereupon they are drawn further downward by said yieldable means independently of the power operated means out of engagement with the wipers, and means for causing said grippers to regrip the marginal edge of the upper at somewhat lower points thereon simultaneously with the movement of said gripper release means out of engagement with said wipers.

6. In a machine for working uppers over lasts, a support for receiving the forepart of the sole of the shoe assembled on the last, a pair of jaws, a movable carrier for said jaws one of which is fixed thereto and the other of which is movable upon the carrier toward the one jaw, power operated means including yieldable means for causing the movable jaw to close against the fixed jaw, thereafter to move the carrier and closed jaws downwardly with respect to the shoe support and hold the carrier in a down drawn position, wipers movable heightwise of the support to shape the upper to the toe and inwardly widthwise thereof to tuck the upper into the crease between the bottom of the last and the margin of the sole, means for effecting heightwise and widthwise movement of the wipers, means for releasing the movable jaw as said wipers approach the level of the sole thereby permitting the yieldable means to draw the carrier and hence, the jaws further downward, and means for causing said movable jaw to again close toward the fixed jaw substantially simultaneously with the movement of the wipers widthwise of the support in their crease forming action.

7. In a machine for working uppers over lasts, a support for receiving the forepart of the sole of a shoe assembled on a last, a pair of jaws, a movable carrier for said jaws, one of which is fixed thereto and the other of which is movable on the carrier toward the fixed jaw, a cam lever, a toggle connecting said movable jaw to said cam lever, yieldable means for maintaining the toggle in an extended position, a cam member movable on said carrier relative to said cam lever and operable by engagement therewith to close said movable jaw against said fixed jaw, power operated means including yieldable means connected to said cam member for effecting movement of the cam member into engagement with the cam lever on said carrier to close the upper jaw and thereafter to move the carrier downwardly and to hold it in a down drawn position, wipers movable heightwise of the shoe support to shape the upper to the toe and inwardly widthwise thereof to tuck the upper into the crease between the bottom of the last and the [margin of the sole, means for] effecting [movement] of the [wipers by] contact of the down wiping movement of the wipers to break the toggle thereby to release the cam lever from engagement with the cam member and simultaneously to lock the cam member from movement [relative] to the carrier whereupon said yieldable [means draws] the carrier downwardly out of [reach of] the wipers, and means operable [on movement] of the carrier and hence the [cam means] out of contact with the wipers [to toggle] to its initial position and to [cam member].

[8. In a machine for] working uppers over lasts, [a support to receive the] bottom of the forepart [of a shoe right] side up, end-embracing [wipers for] movement bodily longitudinally [of the shoe on the] support from a position [remote from the] shoe into operative position, [means for adjust]ing the spacing of the wipers [in their] remote position, visual means operated [by said] adjusting means to indicate the ad[justin]g of the wipers in shoe size prior to [movem]ent to operative position, manually [mea]ns for moving the wipers from their [remote posi]tion into operative position, and [power operat]ed means for moving the wipers [heightwise of] the shoe to wipe the upper toward [the last bott]om.

[9. In a mac]hine for working uppers over lasts, [a support to] receive the bottom of the forepart [of a shoe u]pon a last presented right side up, [end-embrac]ing wipers mounted for movement [longi]tudinally of the shoe on the support [from a posi]tion remote from the shoe into operative position with respect to the shoe, means for adjusting the spacing of the wipers while in their remote position, a member having a graduated scale thereon, a member having an arrow thereon arranged to be moved by said adjusting means along said scale, said scale being calibrated so that movement of the arrow along the scale from one graduation to the next by adjustment of the adjusting means will indicate that the spacing of the wipers has been varied by one shoe size from the preceding spacing, means for moving the wipers from inoperative position to operative position, means for moving the wipers heightwise of the shoe to wipe the upper toward the last bottom, and means for advancing and closing the wipers.

10. In a machine for working uppers over lasts, a shoe support to receive the forepart of a shoe upon a last bottom, end-embracing wipers mounted for movement bodily longitudinally of the shoe on the support from a position remote from the shoe into operative position, means for adjusting the spacing of the wipers while in their remote position, a member having a graduated scale thereon corresponding to a standard scale of shoe sizes, means adjacent to the scale having thereon a reference mark adjacent to said member opposite which the graduation on the member corresponding to the given wiper size is positioned by rotation of said member, and a member having an arrow thereon arranged, when moved by adjustment of said adjusting means, to bring the arrow opposite the selected graduation and reference mark to indicate that the spacing of the wipers corresponds to that indicated by the graduation opposite which the arrow lies.

11. In a machine for working uppers over lasts, a support to receive the forepart of a shoe upon a last, end-embracing wipers mounted for movement bodily longitudinally of the shoe on the support into and out of operative position, means for adjusting the spacing of the wipers while in their inoperative position, a member having a graduated scale of shoe sizes thereon, a frame having reference marks adjacent to the member, corresponding to different upper thicknesses, opposite one of which the graduation on the scale corresponding to the given wiper size is positioned by rotation thereof, and a member having an arrow thereon arranged to be moved by adjustment of said adjusting means and when moved to bring the arrow opposite the selected graduation and reference mark to indicate that the wipers are spaced correctly to wipe a shoe of a size corresponding to the numerical value of the graduation to which the arrow points and whose upper thickness corresponds to the value of fixed reference mark opposite which the graduation lies.

12. In a machine for working uppers over lasts, a support to receive the bottom of the forepart of a shoe presented right side up, end-embracing wipers mounted for movement bodily longitudinally of the shoe on the support from a remote position into operative position with respect to the shoe, a spindle operably connected to said wipers and by rotation of which the spacing of the wipers may be varied, visual indicating means associated with said spindle and movable in proportion to the rotation thereof to indicate the spacing of the wipers prior to their movement into operative position with respect to the shoe, manually operated means for moving the wipers into operative position, and power-operated means for moving the wipers toward the shoe bottom when they are located in operative position.

13. In a machine for working uppers over lasts, a support to receive the bottom of the forepart of a shoe presented right side up, end-embracing wipers mounted for movement bodily longitudinally of the shoe from a position remote from the shoe into operative position with respect to the shoe, a spindle operably connected to said wipers and by rotation of which the spacing of the wipers may be varied, a member having a graduated scale thereon, a member having an arrow thereon arranged to be moved by said spindle in proportion to the rotation of the spindle along said scale while adjusting the spacing of the wipers to indicate the change in the spacing of the wipers, said scale being calibrated so that each graduation represents a difference of one whole shoe size, manually operated means for moving the wipers into operative position with respect to the toe of the shoe, and power-operated means for moving the wipers toward the shoe bottom to wipe the upper about the toe of the shoe.

14. In a machine for working uppers over lasts, a support to receive the forepart of the shoe upon a last bottom, end-embracing wipers of a given size and style mounted for movement bodily longitudinally of the shoe on the support into and out of operative position, a spindle operably connected to said wipers and by rotation of which the spacing of the wipers may be varied, a member having an arrow thereon rotatable in direct proportion to the rotation of the spindle during adjustment of the spacing of the wipers, a fixed member having a reference mark, a member having graduated scales of shoe sizes thereon adjacent to the reference mark, said last-named member being rotatable with reference to said fixed reference mark to bring a graduation corresponding to the given size and style of the wipers on one of its scales opposite said fixed reference mark whereupon when the spindle is rotated to bring the arrow opposite said selected graduation the wipers will reside at a spacing which corresponds to the size indicated by said graduation.

15. In a machine for working uppers over lasts, a support to receive the forepart of a shoe upon a last, end-embracing wipers of a given size and style mounted for movement bodily longitudinally of the shoe on the support into and out of operative position, a spindle operably connected to said wipers and by rotation of which the spacing of the wipers may be varied, a disk having an arrow thereon, a gear fixed to the disk, a gear fixed to said spindle meshing with the gear on the disk, and a rotary member having a graduated scale of shoe sizes thereon adjacent to said disk, a fixed member having a reference mark thereon, said rotary member being movable relative to said reference mark to bring a graduation thereon corresponding to the size and style of said wipers opposite said reference mark, the ratio of the gearing being such that when the spindle is rotated to bring the arrow opposite the graduation which lies opposite the reference mark the wipers will be spaced to accommodate a shoe of the size indicated by said graduation.

16. In a machine for working uppers over lasts, a support to receive the bottom of the forepart of a shoe on a last, a carrier, end-embracing wipers mounted on said carrier for movement bodily longitudinally of the shoe into and out of operative position, and means including a visual indicator for adjusting the spacing of the wipers comprising a pair of arms, a third arm pivoted to the carrier, said pair of arms being each pivotally mounted on the carrier at one end and arranged for bodily movement with the carrier, a screw connecting the opposite end of each of said pair of arms to an end of said third arm, a rod connecting each of the wipers to one of said pair of arms between its ends, longitudinal displacement of which rods will change the spacing of the wipers, and means preventing rotation of said third arm about its pivot to the carrier when the machine is at rest whereby rotation of said screw will move the pair of arms relative to the third arm to displace the rods longitudinally, said visual indicator being connected to said screw and movable thereby in direct proportion to the rotation thereof to indicate the spacing of the wipers while in their inoperative position.

17. In a machine for working uppers over lasts, a support to receive the forepart of a shoe on a last bottom, a carrier, end embracing wipers mounted for movement bodily with the carrier longitudinally of the shoe into and out of operative position, and means including a visual indicator for adjusting the spacing of the wipers comprising a pair of arms each pivotally mounted at one end on the carrier and bodily movable with the wipers, a third arm fulcrumed between its ends on the carrier, a screw connecting the opposite end of each of the pair of arms to one end of said third arm, a rod connecting each of the wipers to one of said pair of arms midway between its ends, and means connected to the other end of said third arm for restraining rotation thereof on its pivot while the wipers are in their inoperative position, said screw being rotatable to rotate the pair of arms relative to the fixed arm thereby to effect adjustment of the spacing of the wipers and said last-named means being operable when said wipers are in their operative position to effect rotation of said third arm and hence, rotation of said pair of arms to close the wipers from their adjusted open position by longitudinal displacement of said rods.

18. In a machine for working uppers over lasts, a support to receive the forepart of a shoe upon the last bottom, a carrier movable to and from an inoperative position, a pair of wipers mounted on said carrier for movement bodily with said carrier from inoperative to operative position, means including a visual indicator for adjusting the spacing of the wipers on the carrier while in its inoperative position comprising a pair of arms each pivotally mounted at one end on the carrier, a third arm pivotally mounted between its ends on the carrier, a screw connecting the opposite end of each of said pair of arms to an end of said third arm, a rod connecting each of the wipers to the midportion of one of said pair of arms, means connected to the other end of said third arm to restrain its movement relative to the carrier while in its inoperative position, said screw being rotatable to move the pair of arms relative to the carrier to displace the rods and hence to change the spacing of the wipers, an indicator connected to said screw for rotation thereby in an amount proportional to the rotation of the screw thereby to indicate the change of spacing, means for moving the carrier forwardly to an operative position without disturbing the relative position of said arms and hence the spacing of the wipers, and means operable after the carrier has been moved to operative position to effect movement of the third arm on the carrier thereby effecting rotation of the pair of arms through the screw to close the wipers from their adjusted open position.

19. In a machine for working uppers over lasts, a support for receiving the forepart of the sole of a shoe assembled on a last, wipers movable to an operative position above the shoe on said support in readiness for down-wiping movement, shoe positioning means adjacent to said support, means for adjusting the spacing of said shoe positioning means to accommodate varying widths of shoes, and means for displacing said positioning means bodily laterally of the support to centralize the shoe beneath the wipers.

20. In a machine for working uppers over lasts, a support for receiving the forepart of the sole of a shoe assembled on a last, wipers movable to an operative position above the shoe on the support in readiness for down-wiping movement, and shoe positioning means adjacent to the support, said shoe positioning means being arranged to project inwardly above the support into engagement with the opposite sides of the last below the upper, being adjustable relative to each other to accommodate a given size last, and being movable together laterally of the support to centralize the shoe with respect to the wipers.

21. In a machine for working uppers over lasts, a support for receiving the forepart of the sole of a shoe assembled on a last, wipers movable to an operative position above the shoe on said support in readiness for down wiping movement, a pair of fingers adjacent to the support for engaging and positioning the toe of the last on the support, a screw for moving said fingers to and from each other, and means associated with the screw for effecting lateral displacement of the fingers relative to the support.

22. In a machine for working uppers over lasts, a support for receiving the forepart of the sole of a shoe assembled on a last, shoe positioning means adjacent to said support comprising a pair of fingers, a link connecting each finger to a plate pivoted on a fixed axis, a screw having right and left hand threaded portions threaded into means pivotally secured to said plates and by rotation of which the plates may be caused to rotate in opposite directions to move the fingers to or from each other, and a sleeve surrounding said screw and operable to move the same lengthwise thereby to rotate the plates in the same direction about their pivots and hence, to shift the fingers while they are maintained at a given spacing laterally with respect to the support.

23. In a toe lasting machine, a shoe support for receiving the forepart of the sole of a shoe assembled on a last, wipers for wiping the upper downwardly over the toe of the last, and spaced positioning means for locating the toe of the shoe on the support correctly with respect to said wipers, said positioning means being adjustable toward each other and laterally of the shoe support, and means for effecting movement of said positioning means outwardly and as a unit downwardly away from the shoe support to an out-of-the-way position.

24. In a machine for working uppers over lasts, a support for receiving the forepart of the sole of a shoe assembled on a last, wipers movable heightwise of the support to produce down-wiping action on the upper and widthwise of the support at the level of the sole to force the upper into the angle between the sides of the last and the margin of the bottom, shoe positioning means adjacent to the support, means for holding said shoe positioning means in a position to engage the last beneath the upper material to centralize the shoe with respect to the wipers, and means to move said positioning means away from the support to positions in which it will not interfere with the in-wiping action of the wipers.

25. In a toe lasting machine, a support for receiving the forepart of the sole of the shoe assembled on a last, wipers for wiping the upper over the toe of the last, means for effecting wiping action of said wipers, a pair of fingers located on the opposite side of the upper from the wipers arranged to press the upper against the wipers during their wiping movement to impart tension to the upper, means for varying the amount of separation of the fingers, and means for varying the position of the fingers laterally of the shoe independently of the amount of separation.

26. In a toe lasting machine, a support for receiving the forepart of the sole of a shoe assembled on a last, toe-end and side grippers for tensioning the upper of the shoe over the toe, wipers movable heightwise and widthwise of a shoe on the support for wiping the tensioned upper about the toe, means for effecting such movement of the wipers, and means located on the opposite side of the upper from the wipers and cooperable with them to press portions of the upper between the toe-end gripper and side grippers against the wipers, and to move with said wipers and outwardly relative thereto during their down-wiping movement to supplement the tensioning of the grippers.

27. In a toe lasting machine, a support for receiving the forepart of the sole of a shoe assembled on a last, wipers movable heightwise of the support for wiping the upper downwardly over the toe of the last, means for effecting such movement, and a pair of fingers for positioning the toe of the shoe correctly endwise with respect to the wipers, said fingers being cooperable with the wipers subsequently to positioning the shoe on the support to press the upper against the underside of the wipers and to move downwardly therewith and outwardly with respect thereto to tension the upper.

28. In a toe lasting machine, a shoe support, wipers movable heightwise of the support for wiping the upper downwardly over the toe of the last, means for effecting such movement, positioning means engaging the toe of the last to position the same correctly with respect to the wipers, said means lying substantially in the plane of the shoe support, and means for effecting movement of said last-named means outwardly simultaneously with the downward wiping action of the wipers to bring the positioning means into engagement with the upper to press the same into frictional engagement with the underside of the wipers.

29. In a toe lasting machine, a shoe support, wipers movable heightwise of the support for wiping the upper downwardly over the toe of the last, means for effecting such movement, a pair of fingers for engaging the toe of the last at opposite sides of the center of the toe to position the same correctly with respect to the wipers, said fingers lying substantially in the plane of the shoe support, means for effecting movement of said fingers to meet the downwardly moving wipers to press the upper into engagement with the underside of the wipers, said fingers being yieldable under the downward movement of the wipers to move downwardly therewith, and means for adjusting the fingers toward and from each other.

30. In a toe lasting machine, a shoe support, wipers movable heightwise and widthwise of the support for wiping the upper downwardly over the toe of the last and inwardly into the crease between the bottom of the last and the marginal flange of the outsole tacked thereto, means for effecting such movement, positioning means for engaging the toe of the last beneath the upper to position the last correctly with respect to the wipers, said positioning means being movable outwardly and downwardly, means for effecting outward movement of said positioning means simultaneously with the downward movement of the wipers to intersect the path of movement of the wipers and press the upper against the underside of the wipers, said wipers thereafter moving said positioning means downwardly by engagement therewith while they simultaneously continue to move outwardly thereby tensioning the upper.

31. In a toe lasting machine, a shoe support, wipers movable heightwise and widthwise of the support for wiping the upper downwardly over the toe of the last and inwardly into the crease between the bottom of the last and the marginal flange of the outsole, means for effecting such movement of the wipers, shoe positioning means comprising a pair of fingers arranged to engage the last below the upper, and means connected to the wiper actuating means to move said fingers into the path of the descending wipers to press the upper against the wipers, said fingers thereafter being movable downwardly by the descending wipers to the level of the sole.

32. In a toe lasting machine, a shoe support, wipers movable heightwise and widthwise of the support for wiping the upper downwardly over the toe of the last and inwardly into the crease between the bottom of the last and the marginal flange of the outsole, means for effecting such movement of the wipers, shoe positioning means comprising a pair of fingers arranged to engage the last below the upper, and cam means connected to the wiper actuating means to move said fingers outwardly and downwardly into the path of the descending wipers, said fingers thereafter being movable downwardly by the descending wipers while continuing to move outwardly to tension the upper.

FRANK COLEMAN CHOICE.
CYRIL HARRY JAMES.

REFERENCES CITED

The following references are of record in the file of this patent:

UNITED STATES PATENTS

| Number | Name | Date |
| --- | --- | --- |
| 938,514 | Pym | Nov. 2, 1909 |
| 1,693,119 | Pym | Nov. 27, 1928 |
| 1,955,730 | Baxter | Apr. 24, 1934 |
| 2,008,069 | Engel | July 16, 1935 |
| 2,444,141 | Miller | June 29, 1948 |

FOREIGN PATENTS

| Number | Country | Date |
| --- | --- | --- |
| 384,552 | Germany | Nov. 3, 1923 |